(12) United States Patent  (10) Patent No.: US 9,165,389 B2
Nakao  (45) Date of Patent: Oct. 20, 2015

(54) IMAGE PROCESSING APPARATUS, IMAGE PROCESSING METHOD, AND PROGRAM

(75) Inventor: Daisuke Nakao, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1177 days.

(21) Appl. No.: 12/497,098

(22) Filed: Jul. 2, 2009

(65) Prior Publication Data

US 2010/0039447 A1  Feb. 18, 2010

(30) Foreign Application Priority Data

Aug. 18, 2008  (JP) .................................. 2008-209931

(51) Int. Cl.
*G06T 11/60* (2006.01)
*H04N 1/387* (2006.01)

(52) U.S. Cl.
CPC ............... *G06T 11/60* (2013.01); *H04N 1/387* (2013.01)

(58) Field of Classification Search
USPC ......................................... 345/634, 635, 637
See application file for complete search history.

(56) References Cited

U.S. PATENT DOCUMENTS

| | | | | |
|---|---|---|---|---|
| 6,115,052 A * | 9/2000 | Freeman et al. | ............... | 345/473 |
| 6,665,342 B1 | 12/2003 | Brown et al. | | |
| 7,123,275 B2 | 10/2006 | Takeshima et al. | | |
| 7,146,022 B2 | 12/2006 | Masukura et al. | | |
| 2003/0189588 A1 | 10/2003 | Girgensohn et al. | | |
| 2004/0096085 A1 | 5/2004 | Matsumoto et al. | | |
| 2004/0125115 A1 | 7/2004 | Takeshima et al. | | |
| 2004/0175035 A1 | 9/2004 | Kameyama | | |

FOREIGN PATENT DOCUMENTS

| | | |
|---|---|---|
| JP | 2-206288 | 8/1990 |
| JP | 2000-78478 | 3/2000 |
| JP | 2002-359777 | 12/2002 |
| JP | 3449993 | 7/2003 |
| JP | 2003-304444 | 10/2003 |
| JP | 2004-180259 | 6/2004 |
| JP | 2004-186994 | * 7/2004 |
| JP | 2004-297197 | 10/2004 |
| JP | 2006-5452 | 1/2006 |
| JP | 2008-187687 | 8/2008 |

OTHER PUBLICATIONS

Andrew Davidhazy, Simplified stroboscopic system for motion pattern photography, Apr. 24, 1999, Rochester Institute of Technology, RIT Scholar Works, 12 pages.*

(Continued)

*Primary Examiner* — Jeffery A Brier
(74) *Attorney, Agent, or Firm* — Oblon, McClelland, Maier & Neustadt, L.L.P.

(57) ABSTRACT

An image processing apparatus includes a layer separating unit configured to separate an input frame image data item into a moving subject layer and a background layer and a combining processing unit configured to generate a combined image data item by performing an image combining process using the input frame image data item. In the image combining process, top priority is given to a moving subject layer of the latest input frame image data item, a second priority is given to a moving subject layer of a frame image data item associated with a previously performed combining process, and a layer-image combining process is performed for a partial area of an existing combined image data item.

18 Claims, 33 Drawing Sheets

(56) References Cited

OTHER PUBLICATIONS

Canon Digital Photography Forums, Aug. 2007, 4 pages.*
Adobe Photoshop CS3 User Guide for Windows and Mac OS, 2007, Adobe Systems Incorporated, pp. 1-674.*
Jackie Assa, et al., "Action Synopsis: Pose Selection and Illustration" ACM Transactions on Graphics, vol. 24, No. 3, XP002554048, Jul. 2005, pp. 667-676.
Byungmoon Kim, et al., "Video-based Nonphotorealistic and Expressive Illutration of Motion", Computer Graphics International, XP010830613, Jun. 22, 2005, pp. 32-35.
J. P. Collomosse, et al., "Rendering cartoon-style motion cues in post-production video", Graphical Models, Elsevier, vol. 67, No. 6, XP005126779, Nov. 1, 2005, pp. 549-564.
Office Action issued Jul. 30, 2015, in Korean Patent Application 10-2009-0075709 (with English translation).

* cited by examiner

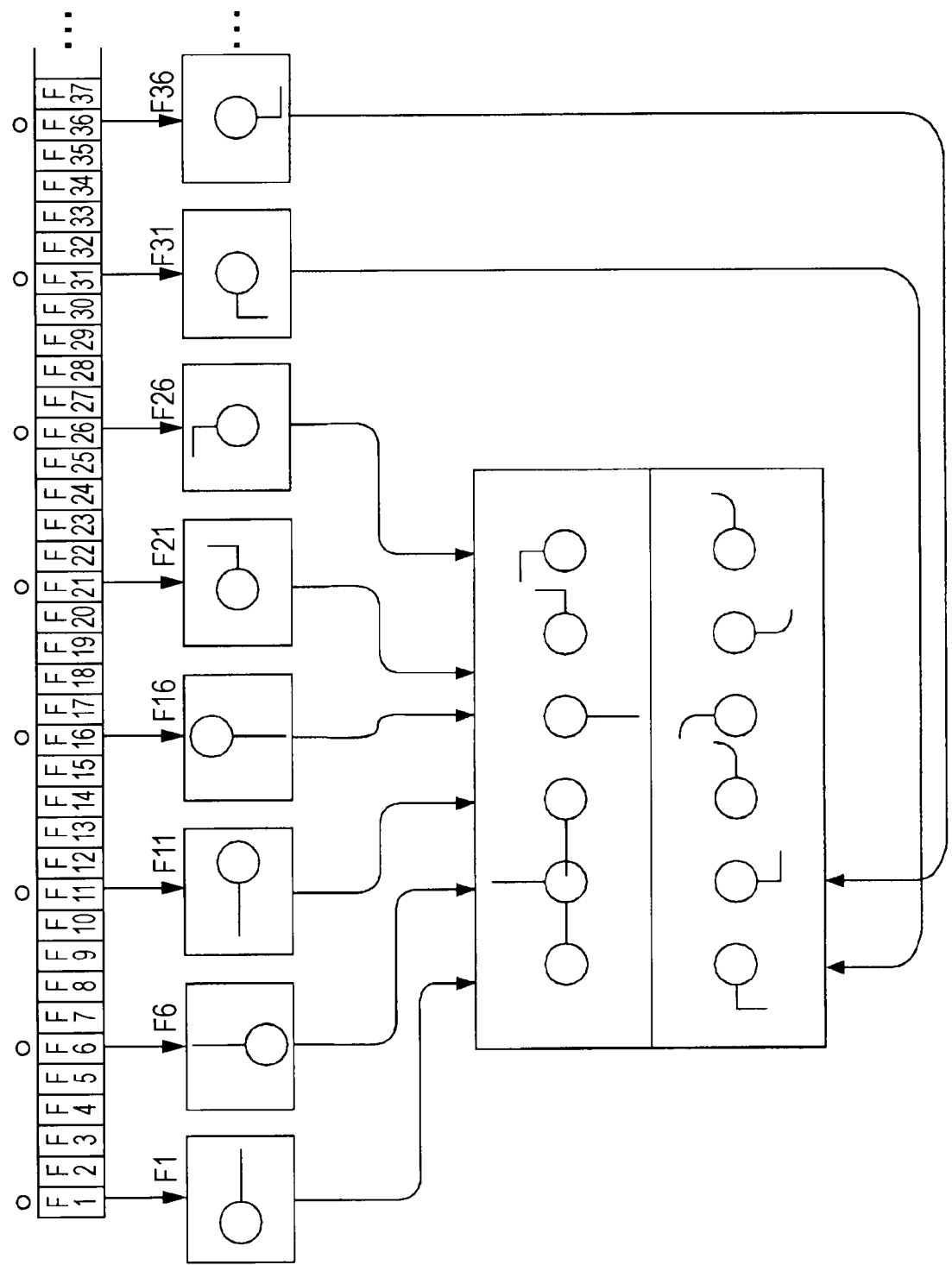

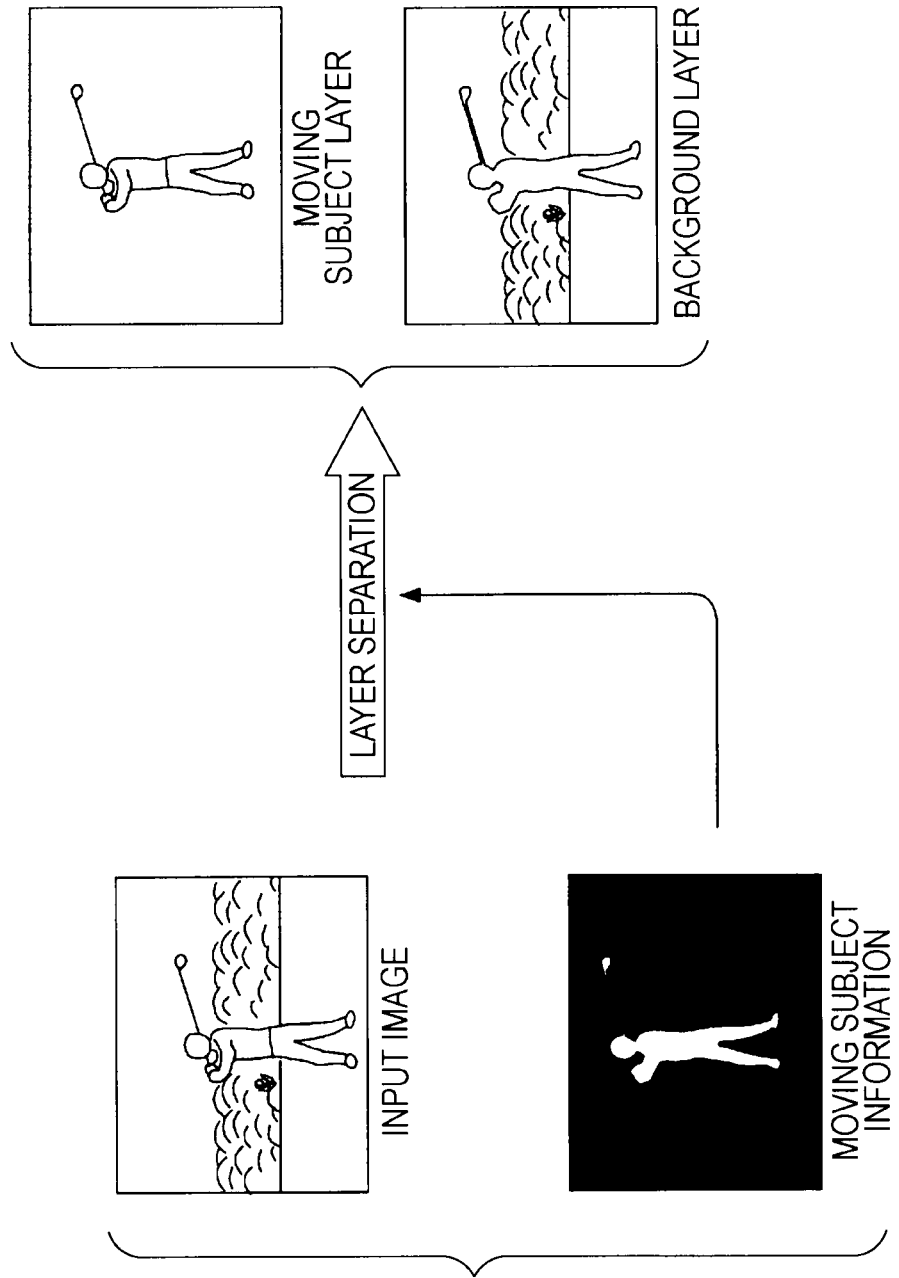

INPUT IMAGE

MOTION SEQUENCE
EFFECTIVE AREA

REMAINING
BACKGROUND AREA

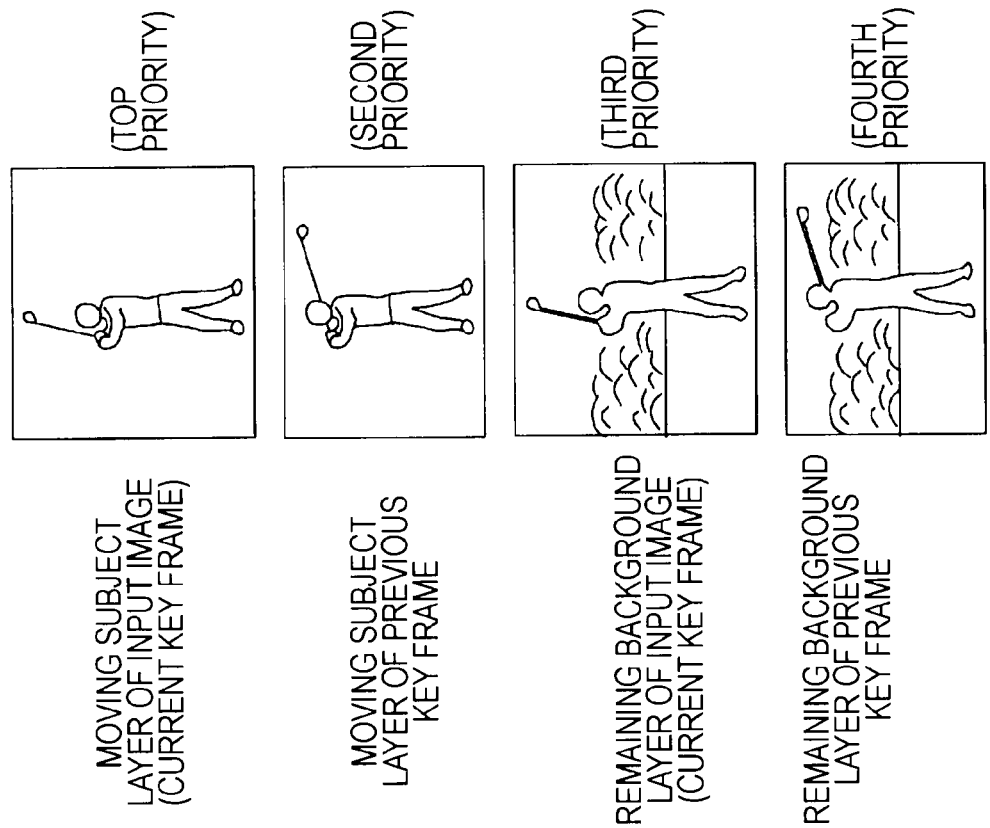

INPUT IMAGE

MOTION SEQUENCE
EFFECTIVE AREA

PREVIOUS
COMBINED IMAGE

COMBINED IMAGE
PRECEDING PREVIOUS
COMBINED IMAGE

INPUT IMAGE
<PROCESS P2>

MOTION SEQUENCE EFFECTIVE AREA

COPY

PREVIOUS COMBINED IMAGE
<PROCESS P3>

COPY

MOVING SUBJECT
IMAGE OF INPUT IMAGE
(TOP PRIORITY)

⇩ COMBINE MOVING SUBJECT IMAGE WITH CORRESPONDING AREA

MOVING SUBJECT IMAGE
OF PREVIOUS KEY FRAME
(SECOND PRIORITY)

⇩ COMBINE MOVING SUBJECT IMAGE WITH CORRESPONDING AREA

BACKGROUND IMAGE
OF INPUT IMAGE
(THIRD PRIORITY)

⇩ OVERWRITE CORRESPONDING AREA OF OUTPUT IMAGE

FIG. 27A
MOVING SUBJECT IMAGE OF INPUT IMAGE (TOP PRIORITY)

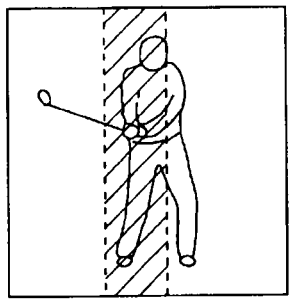

⇩ COMBINE MOVING SUBJECT IMAGE WITH CORRESPONDING AREA

FIG. 27B
MOVING SUBJECT IMAGE OF PREVIOUS KEY FRAME (SECOND PRIORITY)

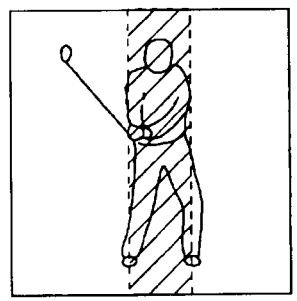

⇩ COMBINE MOVING SUBJECT IMAGE WITH CORRESPONDING AREA

FIG. 27C
MOVING SUBJECT IMAGE OF KEY FRAME PRECEDING PREVIOUS KEY FRAME (THIRD PRIORITY)

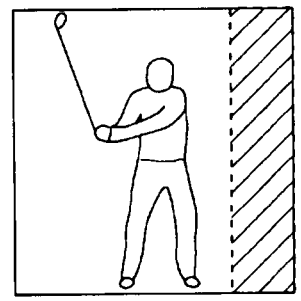

⇩ COMBINE MOVING SUBJECT IMAGE WITH CORRESPONDING AREA

FIG. 27D
BACKGROUND IMAGE OF INPUT IMAGE (FOURTH PRIORITY)

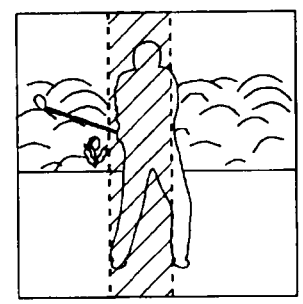

⇨ OVERWRITE CORRESPONDING AREA OF OUTPUT IMAGE

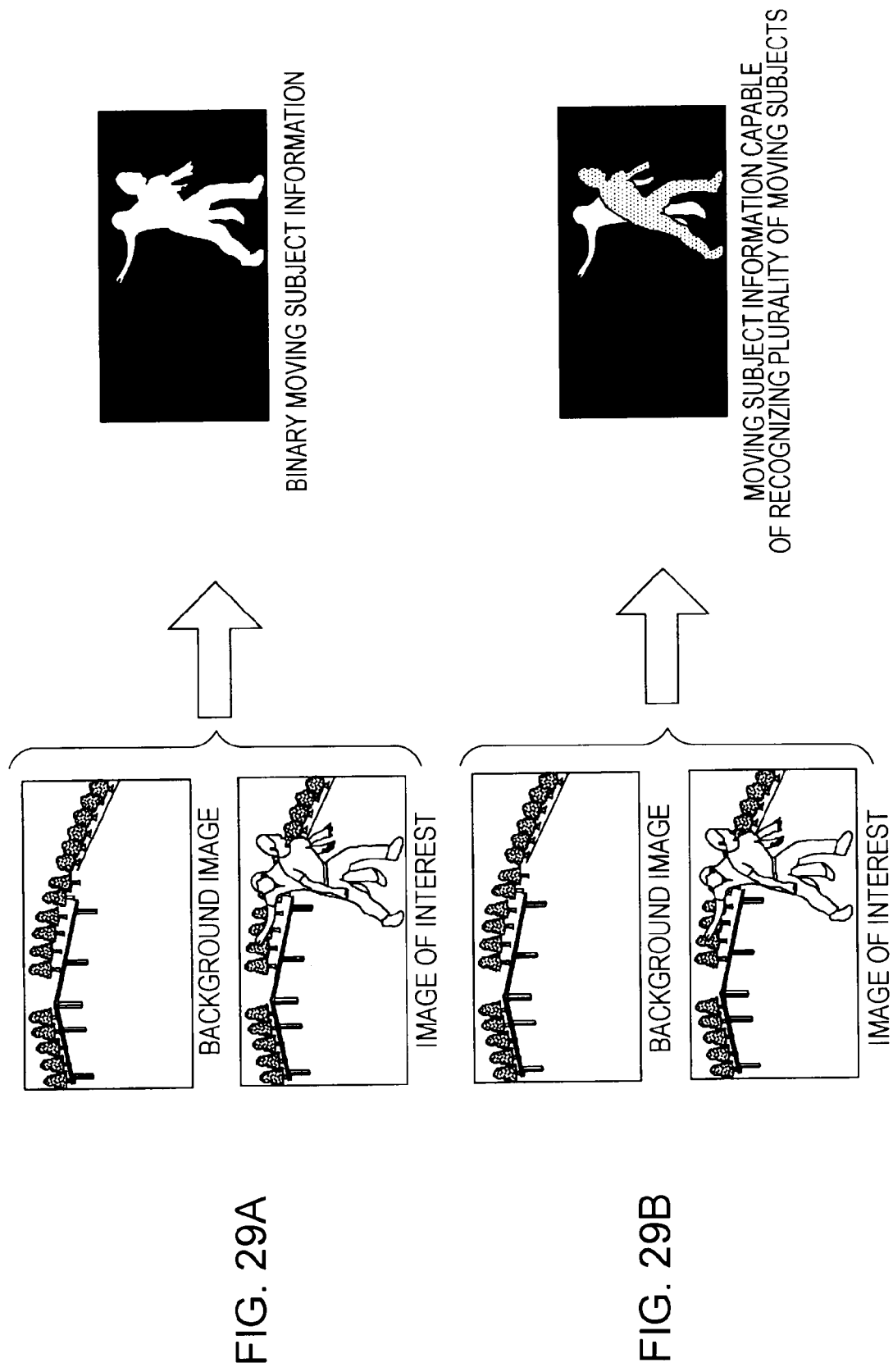

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program and, in particular, to an image processing apparatus, an image processing method, and a program for acquiring a still image or a moving image indicating a motion sequence of a photographic subject.

2. Description of the Related Art

The related art is described in Japanese Patent No. 3449993, Japanese Unexamined Patent Application Publication No. 2004-180259 (corresponding to U.S. Pat. No. 7,123,275), Japanese Unexamined Patent Application Publication No. 2007-259477 (a divisional application of Japanese Unexamined Patent Application Publication No. 2004-180259), and Japanese Unexamined Patent Application Publication No. 2002-359777 (corresponding to U.S. Pat. No. 7,146,022).

As shown in FIG. 32, a "motion sequence image" is used in, for example, sports training.

A motion sequence image is generated by acquiring images of a moving human or a subject (a moving subject) at predetermined characteristic times (key-frame times) and, subsequently, arranging the images in space. Thus, a motion sequence can be easily recognized. A motion sequence image is generated such that images of a moving subject are spatially arranged even when the moving subject does not spatially move. In general, a motion sequence image is generated by drawing a picture. However, in some cases, by manually clipping part of an image from each photo and arranging the partial images, a motion sequence image can be also generated.

SUMMARY OF THE INVENTION

In order to automatically generate such a motion sequence image using existing methods, images representing key frames to be processed are extracted from among images of a plurality of frames obtained by a video camera or through continuous shooting performed by a still camera. Subsequently, the image of a target subject is extracted from each of the key frames, and the extracted images are arranged.

However, in existing motion sequence images, it is difficult to expand the range of motion illustrated while maintaining sufficient representation of the motion.

For example, FIG. 32 illustrates an example of a motion sequence image generated using key frames FK1 to FK20 extracted from moving image data of a golf swing captured by a video camera.

If, as shown in FIG. 32, a single composite image is generated using a plurality of key frames, an extraction width wa for one frame becomes narrower when the key frame images are arranged. Accordingly, it is difficult for the single composite image to cover the entire motion range of the moving subject and, therefore, part of the image of the target moving subject disappears. For example, as indicated by the images shown in FIG. 32, an image of the top portion of a golf club disappears at some times during the swing motion. This is not visually desirable. In addition, the composite image does not satisfy the intended use of the composite image, such as checking of form.

In order to prevent part of an image of a moving subject (e.g., a human swinging a golf club and the golf club) from disappearing from the image, it is necessary that the width of each extracted image be increased.

FIG. 33 illustrates an example in which a width wb of an image extracted from a key frame image is increased. In such a case, the number of the key frames arranged in one image is decreased. For example, a motion sequence image shown in FIG. 33 is generated by selecting eight key frames FK1, FK4, FK7, FK10, FK11, FK14, FK17, and FK20 from among 20 key frames FK1 to FK20 shown in FIG. 32.

In this case, when looking at each of the key frames, part of a moving subject (e.g., a human swinging a golf club and the golf club) does not disappear. However, since the number of key frames that can be arranged in one image is decreased, the smoothness of the motion disappears from the motion sequence image. That is, the motion sequence image does not sufficiently indicate the details of the motion for, for example, checking of form.

As indicated by the examples shown in FIGS. 32 and 33, if the extracted image width is increased in order to cover the entire motion range of a moving subject, the number of key frames present in a final generated image is decreased. Accordingly, the motion sequence is not sufficiently visualized. In contrast, if the extracted image width is decreased, the number of key frames can be increased. Therefore, the motion sequence can be visualized in more detail. However, it is difficult for the image to cover the entire motion range of the moving subject and, therefore, part of an image of the moving subject may disadvantageously disappear.

Such an existing motion sequence image is a still image generated by simply arranging and combining a plurality of key frames so as to visualize the motion sequence. However, these days, a demand for a more visually effective motion sequence image has arisen.

Accordingly, the present invention provides a motion sequence image that visualizes sufficient details of motion by using a plurality of frame images and that covers an appropriate motion range of a moving subject. Furthermore, the present invention provides the motion sequence image in the form of a moving image having a sufficient visual effect.

According to an embodiment of the present invention, an image processing apparatus includes a layer separating unit configured to separate an input frame image data item into a moving subject layer and a background layer and a combining processing unit configured to generate a combined image data item by performing an image combining process using the input frame image data item. In the image combining process, top priority is given to a moving subject layer of the latest input frame image data item, a second priority is given to a moving subject layer of a frame image data item associated with a previously performed combining process, and a layer-image combining process is performed for a partial area of an existing combined image data item.

The image processing apparatus can further include an image output unit configured to output, in the form of a motion sequence still image data item, the combined image data item obtained through the image combining process performed by the combining processing unit for a predetermined number of frame image data items.

The image processing apparatus can further include an input image selection unit configured to select a key frame used for generating the combined image data item from among the input frame image data items. The combining processing unit can perform the image combining process according to the frame image data item selected as a key frame so as to generate a motion sequence still image data item.

The image processing apparatus can further include a combined image preserving unit configured to preserve the combined image data item as the existing combined image data item used for the next image combining process.

The image processing apparatus can further include an image output unit configured to continuously output, in the form of a motion sequence moving image data item, the combined image data item generated by the combining processing unit each time a combined image data item is generated.

In this case, the image processing apparatus can further include an input image selection unit configured to select a key frame used for generating a combined image from each of the input frame image data items and a combined image preserving unit configured to preserve, as the existing combined image data item used for the next image combining process, a combined image data item generated through the combining process performed by the combining processing unit according to the key frame.

The combining processing unit can generate a motion sequence moving image data item by generating a combined image data item through an image combining process performed according to each of the input frame image data items regardless of whether the input frame image data item is selected as a key frame.

In addition, the combining processing unit can perform the image combining process for a predetermined area of an existing combined image data item by giving top priority to a moving subject layer of the latest input frame image data item, a second priority to a moving subject layer of a frame image data item associated with the immediately previously performed combining process, a third priority to a background layer of the latest input frame image data item, and a fourth priority to a background layer of the frame image data item associated with the immediately previously performed combining process.

Furthermore, upon performing the image combining process in which the latest input frame image data item is combined with a predetermined area of an existing combined image data item, the combining processing unit can selectively perform, in accordance with a position of a pixel to be processed, one of a process in which a pixel extracted from the latest input frame image data item is applied to the predetermined area, a process in which a pixel extracted from a moving subject layer of the latest input frame image data item is applied to the predetermined area, a process in which a pixel extracted from one of the previously generated combined image data items is applied to the predetermined area, and a layer image combining process using the latest input frame image data item and one of the previously generated combined image data items.

In this case, in the layer image combining process, top priority can be given to a pixel of the moving subject layer of the latest input frame image data item, a second priority can be given to a pixel of the moving subject layer of a frame image data item associated with one of previously performed combining processes, and a third priority can be given to a pixel of the background layer of the latest input frame image data item.

Alternatively, the layer image combining process can be performed by giving top priority to a pixel of the moving subject layer of the latest input frame image data item, second to n-th priorities to pixels of frame image data items associated with a one-process preceding combined image data item, and a (n+1)th priority to a pixel of the background layer of the latest input frame image data item.

According to another embodiment of the present invention, an image processing apparatus includes a layer separating unit configured to separate an input frame image data item into a moving subject layer and a background layer and a combining processing unit configured to generate a combined image data item by performing an image combining process using the input frame image data item. In the image combining process, a layer-image combining process is performed for a partial area of an existing combined image data item so that top priority is given to a moving subject layer of the latest input frame image data item, a second priority is given to a moving subject layer of an input frame image data item associated with a previously performed combining process, and the layers are displayed.

According to still another embodiment of the present invention, an image processing apparatus includes a combining processing unit configured to generate and output a combined image data item by performing an image combining process each time the frame image data item is input so that a moving image in which moving subject images in the frame image data items are sequentially arranged in a predetermined direction is displayed. In the moving image, the moving subject image of the frame image data item selected as a key frame is continuously displayed, and the moving subject image of the frame image data item not selected as a key frame is temporarily displayed.

According to yet still another embodiment of the present invention, a method for processing an image is provided. The method includes the steps of separating an input frame image data item into a moving subject layer and a background layer and performing an image combining process including a layer-image combining process using the input frame image data item. The layer-image combining process is performed for a partial area of an existing combined image data item by giving top priority to a moving subject layer of the latest input frame image data item and giving a second priority to a moving subject layer of a frame image data item associated with a previously performed combining process.

According to yet still another embodiment of the present invention, a method for processing an image is provided. The method includes the steps of separating an input frame image data item into a moving subject layer and a background layer and performing an image combining process including a layer-image combining process using the input frame image data item. The layer-image combining process is performed for a partial area of an existing combined image data item by giving top priority to a moving subject layer of the latest input frame image data item and giving a second priority to a moving subject layer of an input frame image data item associated with a previously performed combining process, and the layers are displayed.

According to yet still another embodiment of the present invention, a method for processing an image is provided. The method includes the steps of generating a combined image data item by performing an image combining process each time the frame image data item is input and displaying a moving image in which moving subject images in the frame image data items are sequentially arranged in a predetermined direction by repeating generating a combined image data item. In generating a combined image data item, the image combining process is performed so that moving subject image of the frame image data item selected as a key frame is continuously displayed, and the moving subject image of the frame image data item not selected as a key frame is temporarily displayed.

According to yet still another embodiment of the present invention, a program that causes an arithmetic processing apparatus to perform these methods for processing an image is provided.

That is, according to the present invention, a motion sequence image is generated by performing an image combining process on a plurality of input frame image data items. Note that the term "frame image data item" refers to one of frames of a moving image or one of still images obtained through, for example, continuous shooting. That is, the term "frame image data item" widely refers to an image data item forming each of individual images.

According to the present invention, when a motion sequence image is generated by performing an image combining process on a plurality of input frame image data items, the frame image data item is separated into a moving subject layer and a background layer of an image. Thereafter, each time a frame image data item is input, the latest input frame image data item is combined with a combined image data item existing when the frame image data item is input. At that time, by reducing the width of the frame, a large number of moving subject images can be arranged. However, in this case, a portion in which the image of the moving subject in the latest frame image data item overlaps with the image of the moving subject in the previous frame image data item is generated. Accordingly, a layer-image combining process is performed by giving top priority to the moving subject layer of the latest input frame image data item and giving a second priority to the moving subject layer of a frame image data item associated with a previously performed combining process. In this way, a combined image can be generated in which part of the moving subject image overlaps with the moving subject image in the previous frame.

In addition, this method can be applied to a moving image. In the case of a moving image, an image combining process is performed on each of the sequentially input frame image data items, and the result of the combining process at each time can be output as moving image data (a motion sequence moving image).

According to the above-described embodiments, when a motion sequence image is automatically generated, the entire image of a moving subject can be represented by expanding the motion range. In addition, precise representation of a motion sequence in a time direction can be achieved by arranging a large number of images of the moving subject.

Furthermore, by outputting combined image data items at different time points in the form of a motion sequence moving image, a moving image having a high visual effect and providing easy understanding of a motion sequence to users can be generated.

BRIEF DESCRIPTION OF THE DRAWINGS

FIGS. 3A to 3C are schematic illustrations of a motion sequence still image generation process according to the embodiment;

FIGS. 4A and 4B are schematic illustrations of a layer separation process according to the embodiment;

FIGS. 7A and 7B illustrate an exemplary layer combining process of four layers according to the embodiment;

FIGS. 27A to 27D illustrate a process P6 selected in the second example of generation processing according to the embodiment;

FIGS. 29A and 29B illustrate moving subject information represented using a binary value and moving subject information represented using a multi-level value;

DESCRIPTION OF THE PREFERRED EMBODIMENTS

An exemplary embodiment of the present invention is described below in the following sections:
1. Configuration of Image Processing Apparatus
2. First Example of Processing for Generating Motion Sequence Image
3. Second Example of Processing for Generating Motion Sequence Image
4. Moving Subject Information
5. Application of First Example of Processing to Moving Image
6. Application of Second Example of Processing to Moving Image
7. Program 1. Configuration of Image Processing Apparatus FIG. 1 illustrates an exemplary configuration of an image processing apparatus 1 according to the present exemplary embodiment.

Figure 1:
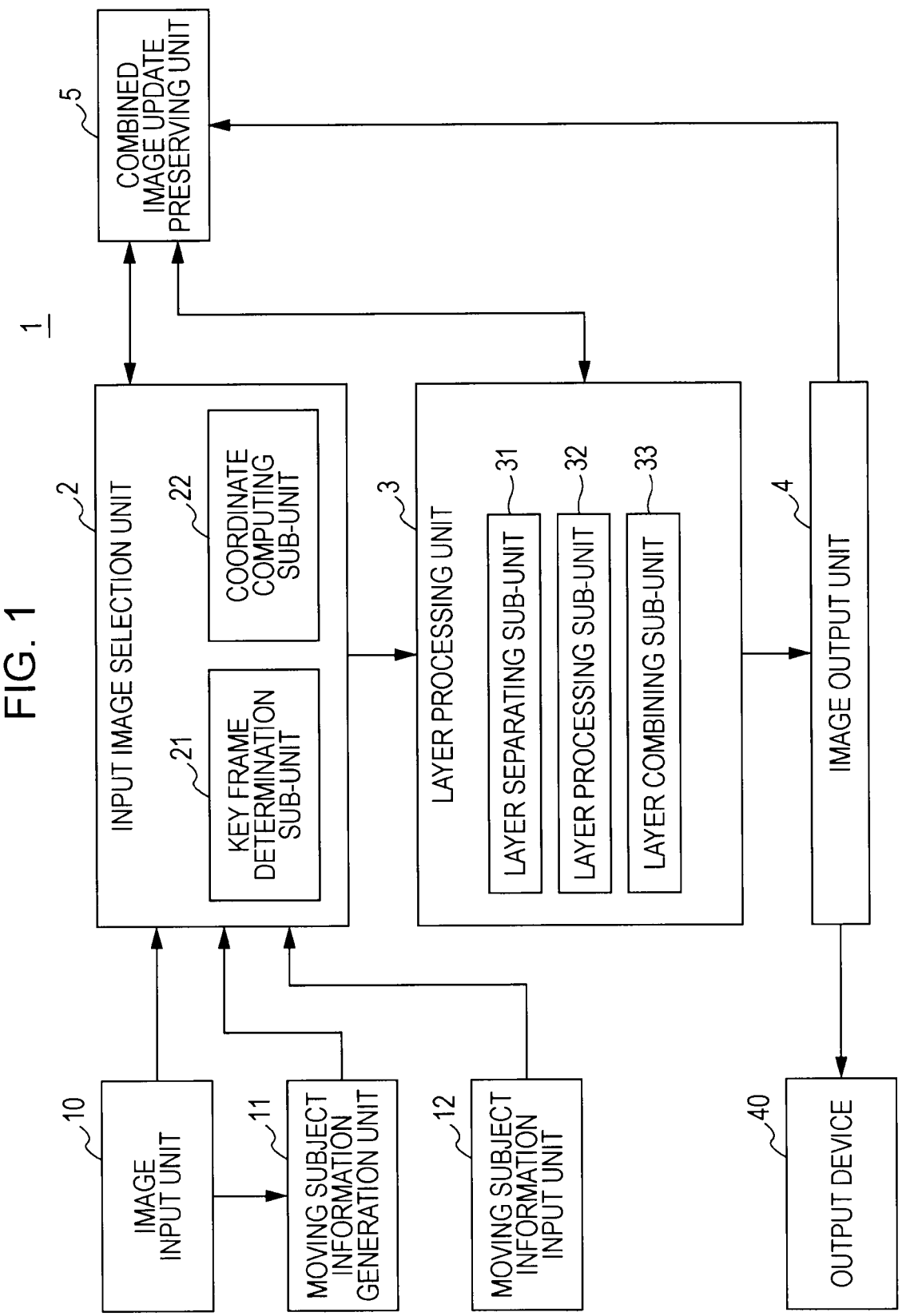
FIG. 1 is a block diagram of an image processing apparatus according to an embodiment of the present invention.

As shown in FIG. 1, the image processing apparatus 1 includes an input image selection unit 2, a layer processing unit 3, an image output unit 4, a combined image update preserving unit 5, an image input unit 10, a moving subject information generation unit 11, a moving subject information input unit 12, and an output device 40.

These units and device are necessarily included in one body. In particular, the image input unit 10, the moving subject information generation unit 11, the moving subject information input unit 12, and the output device 40 may be included in a different body. In addition, only one of the moving subject information generation unit 11 and the moving subject information input unit 12 may be provided in the image processing apparatus 1.

Each of the input image selection unit 2, the layer processing unit 3, the image output unit 4, and the combined image update preserving unit 5 may be configured as a hardware block. However, each of the input image selection unit 2, the layer processing unit 3, the image output unit 4, and the combined image update preserving unit 5 may be configured as a functional block realized by a software program running in an arithmetic processing unit, such as a microcomputer.

The image processing apparatus 1 may be incorporated in, for example, an image pickup apparatus (e.g., a video camera) or a video playback apparatus. Alternatively, the image processing apparatus 1 may be configured as a dedicated image processing apparatus. Still alternatively, the image processing apparatus 1 may be configured as an apparatus having an image processing function realized by cooperation of software and hardware in, for example, a personal computer.

The image input unit 10 receives a frame image data group used for generating a motion sequence image (a still image or a moving image).

The term "frame image data item" refers to one of frames of a moving image or one of still images obtained through, for example, continuous shooting. That is, the term "frame image data item" widely refers to an image data item forming each of individual images.

When the image processing apparatus 1 is incorporated in an image pickup apparatus, the image input unit 10 corresponds to a lens system, a light receiving element, and an image capturing system that acquires a captured image signal through image signal processing.

When a captured image signal acquired by an external image pickup apparatus is input, the image input unit 10 may be a system for receiving and processing an image signal transferred or downloaded from the external image pickup apparatus. For example, the image input unit 10 may be an external apparatus interface unit, such as a broadcast tuner unit, a universal serial bus (USB) interface, or a network communication unit for wireless or wired communication.

Alternatively, when an image signal, such as a captured image data, is stored in a recording medium, such as a memory card (a solid-state memory) or an optical disk, the image input unit 10 is realized in the form of a reproducing unit or a reproducing program for reproducing the image signal stored in the recording medium.

The image input unit 10 receives image data of each of the frames of a moving image or still image data of a plurality of frames captured through continuous shooting. The image input unit 10 then supplies such frame image data to the input image selection unit 2 and the moving subject information generation unit 11.

Note that the image input unit 10 may perform pre-processing. Upon receiving a moving image file, the image input unit 10 may perform appropriate conversion on the moving image file. For example, the image input unit 10 may generate frames from the moving image file. In addition, upon receiving an interlace image, the image input unit 10 may convert the interlace image into a progressive image. Furthermore, the image input unit 10 may enlarge or reduce the size of the image.

The moving subject information generation unit 11 generates moving subject information using the original image group (the frame image data group) received from the image input unit 10 and additional information (e.g., depth information).

The term "moving subject information" refers to information at least indicating which part of the input frame image data item corresponds to a moving subject and which part corresponds to a background.

The moving subject information generation unit 11 generates moving subject information corresponding to each of the input frame image data items. Thereafter, the moving subject information generation unit 11 supplies the generated moving subject information to the input image selection unit 2.

The moving subject information may be represented as a moving subject image. In such a case, whether each of pixels corresponds to the moving subject or the background is indicated by a pixel value. In addition, information indicating the position of the subjects may be expressed using a mathematical expression or a vector.

The moving subject information generation unit 11 separates the moving subject from the background. In addition, when a plurality of moving subjects are present, the moving subject information generation unit 11 may separate the moving subjects from one another for each of depths. In such a case, in order to represent the moving subject information using an image, instead of representing the image as a binary image that indicates whether the image corresponds to the moving subject or the background, the image is represented as a multi-level value image (or a multi-channel image) that indicates at which depth each pixel is located. This processing is described in more detail below with reference to FIGS. 28 and 29.

The moving subject information is not necessarily generated in the image processing apparatus 1. Instead, the image processing apparatus 1 can receive moving subject information generated by a different apparatus or a different program. The moving subject information input unit 12 externally receives moving subject information associated with each of frame image data items input to the image input unit 10. The moving subject information input unit 12 then supplies the received moving subject information to the input image selection unit 2.

Accordingly, at least one of the moving subject information generation unit 11 and the moving subject information input unit 12 is necessary. However, moving subject information generated by the moving subject information generation unit 11 and moving subject information received by the moving subject information input unit 12 may be used at the same time. In this case, the moving subject information generation unit 11 and the moving subject information input unit 12 are provided.

The input image selection unit 2 performs processing for generating a motion sequence image from frame image data items sequentially supplied from the image input unit 10. That is, the input image selection unit 2 selects image data items necessary for a combining process performed by the layer processing unit 3. The input image selection unit 2 then outputs a set of appropriate images to the layer processing unit 3. In addition, the input image selection unit 2 outputs, to the layer processing unit 3, moving subject information corresponding to the frame image data items to be output to the layer processing unit 3 and information necessary for the combining process, such as coordinate information.

As shown in FIG. 1, the input image selection unit 2 includes a key frame determination sub-unit 21 and a coordinate computing sub-unit 22. The key frame determination sub-unit 21 performs a key frame determination process and selects frame image data items to be output to the layer processing unit 3 on the basis of the key frame determination process. The coordinate computing sub-unit 22 computes the coordinates necessary for the combining process.

As used herein, the term "key frames" refers to a plurality of different images serving as a trajectory of a motion sequence and remaining in a final output image (a final frame image in the case of a moving image) at different time points on a time axis. For example, in general, from among temporally continuous frame image data items, frames captured at even intervals during an appropriate unit time are selected as key frames. However, the key frames are not limited to key frames captured at even intervals. For example, key frames captured at uneven intervals appropriate for visualizing the motion sequence of a target subject may be used.

The key frame determination sub-unit 21 selects the frame image data items serving as key frames from among the frame image data items sequentially supplied from the image input unit 10. As described in more detail below, when a motion sequence still image is generated, the key frame determination sub-unit 21 supplies only the selected key frames to the layer processing unit 3. In contrast, when a motion sequence moving image is generated, the key frame determination sub-unit 21 supplies all of the input frame image data items to the layer processing unit 3. In this case, the layer processing unit 3 changes processing of a combined image in accordance with whether the input frame image data item is a key frame or not.

The layer processing unit 3 includes a layer separating sub-unit 31, a layer processing sub-unit 32, and a layer combining sub-unit 33. The layer processing unit 3 generates a motion sequence image.

The layer separating sub-unit 31 separates an input frame image data item into layers using the moving subject information. According to the present embodiment, each of the frame image data items is separated into two layers: a moving subject layer and a background layer. For example, the layer separating sub-unit 31 separates an input image and the previous key frame image into background images and moving subject images using the moving subject information so as to generate the images in the corresponding layers. When a plurality of moving subject images are present and if the depths of the moving subject images are indicated, the moving subject images are separated into layers each corresponding to one of the depths.

For example, the layer processing sub-unit 32 cuts part of an image on each of the layers, enlarges or reduces an image on each of the layers, or shifts the coordinates of the image. That is, the layer processing sub-unit 32 performs various processing on an image in each of the separated layers so that the images can be combined. In general, the layer processing sub-unit 32 performs geometrical computation, such as an enlargement/reduction process, a rotation process, and a translation process. However, the layer processing sub-unit 32 may perform image processing, such as image enhancement of a moving portion. The enlargement/reduction process is performed on the basis of the number of key frames and the output image size.

The layer combining sub-unit 33 performs an image combining process using a processed layer and a previously combined image. That is, the layer combining sub-unit 33 generates a combined image to be output by using an image processed by the layer processing sub-unit 32, a previously combined image, and the moving subject information. In this combining process, the layer combining sub-unit 33 determines which layer includes pixels to be included in the output image on the basis of the moving subject information and generates the output image. The layer combining sub-unit 33 selects a single layer and output the pixels in the layer. Alternatively, the layer combining sub-unit 33 may select a plurality of layers, combines the pixels in the layers, and output the combined pixels. The processing performed by the layer processing unit 3 is described in more detail below.

The image output unit 4 outputs, to the output device 40, the combined image generated by the layer processing unit 3. Examples of the output device 40 include a variety of units that can receive the motion sequence image, such as a monitor unit or a storage unit. The motion sequence image output from the image output unit 4 may be displayed, be loaded onto a memory, or be written to an external storage medium, such as a hard disk, a flash memory, and another apparatus in a network, in accordance with the type of system.

In order to generate a motion sequence still image, the image output unit 4 outputs, to the output device 40, one-frame image data generated as a motion sequence still image when a combining process on frame image data items of a predetermined number of key frames is completed.

In contrast, in order to generate a motion sequence moving image, the image output unit 4 outputs, to the output device 40, a combined image generated through a combining process sequentially performed every time a frame image data item is input as one-frame image data of a moving image.

When generating a motion sequence still image in which all of the frame image data items to be combined are key frames, the image output unit 4 outputs the current combined image data item to the combined image update preserving unit 5 so that the combined image update preserving unit 5 updates and stores the combined image in order to use the current combined image data item as the previous combined image data item when the next processing is performed.

In contrast, when a motion sequence moving image is generated and if the currently processed frame image data is a key frame, the image output unit 4 outputs the current combined image data item to the combined image update preserving unit 5 so that the combined image update preserving unit 5 updates and stores the combined image in order to use the current combined image data item as the previous combined image data item when the next processing is performed.

While the motion sequence still image is being generated, the combined image update preserving unit 5 preserves combined image data items obtained when each of image data items is input.

For example, in order to generate a motion sequence still image, the combined image update preserving unit 5 updates a combined image every time the image output unit 4 outputs the combined image. The combined image update preserving unit 5 then preserves the updated combined image. For example, during the combining process, the combined image update preserving unit 5 updates the previous combined image data item and preserves the updated combined image data item as the previous combined image data item or the combined image data item before last. In addition, the combined image update preserving unit 5 preserves key frame information obtained when each of the combined images is generated and the moving subject information regarding the key frame.

In contrast, while the motion sequence moving image is being generated, the combined image update preserving unit 5 updates the combined image data item generated through the key frame combining process and preserves the combined image data item. As in the case in which a motion sequence still image is generated, the combined image update preserving unit 5 preserves key frame information obtained when each of the combined images is generated and the moving subject information regarding the key frame.

2. First Example of Processing for Generating Motion Sequence Image

A first example of processing for generating a motion sequence image mainly performed by the input image selection unit 2, the layer processing unit 3, the image output unit 4, and the combined image update preserving unit 5 is described below.

Figure 2:
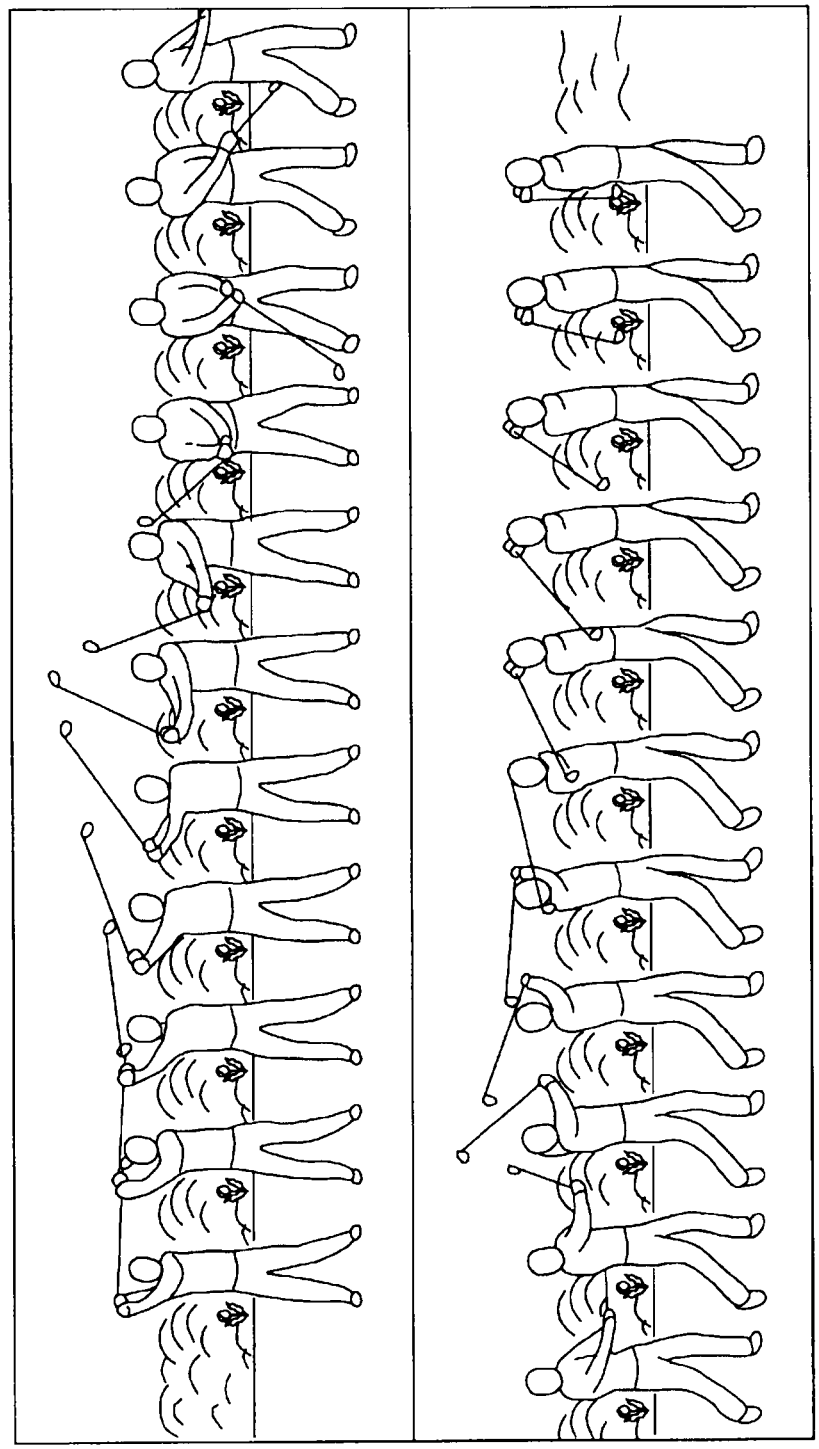
FIG. 2 is a diagram illustrating a motion sequence still image according to the embodiment.

In this example, a motion sequence still image as shown in FIG. 2 is generated. The outline of the first example of processing for generating a motion sequence still image is described with reference to FIGS. 2 to 8. A particular example of processing is described with reference to FIGS. 9 and 10.

A motion sequence still image generated by the image processing apparatus 1 according to the present embodiment is described first with reference to FIG. 2.

For example, the motion sequence still image as shown in FIG. 2 is generated from a plurality of frame image data items obtained by capturing a video image or continuous shooting still images of a human swinging a golf club.

Figure 32:
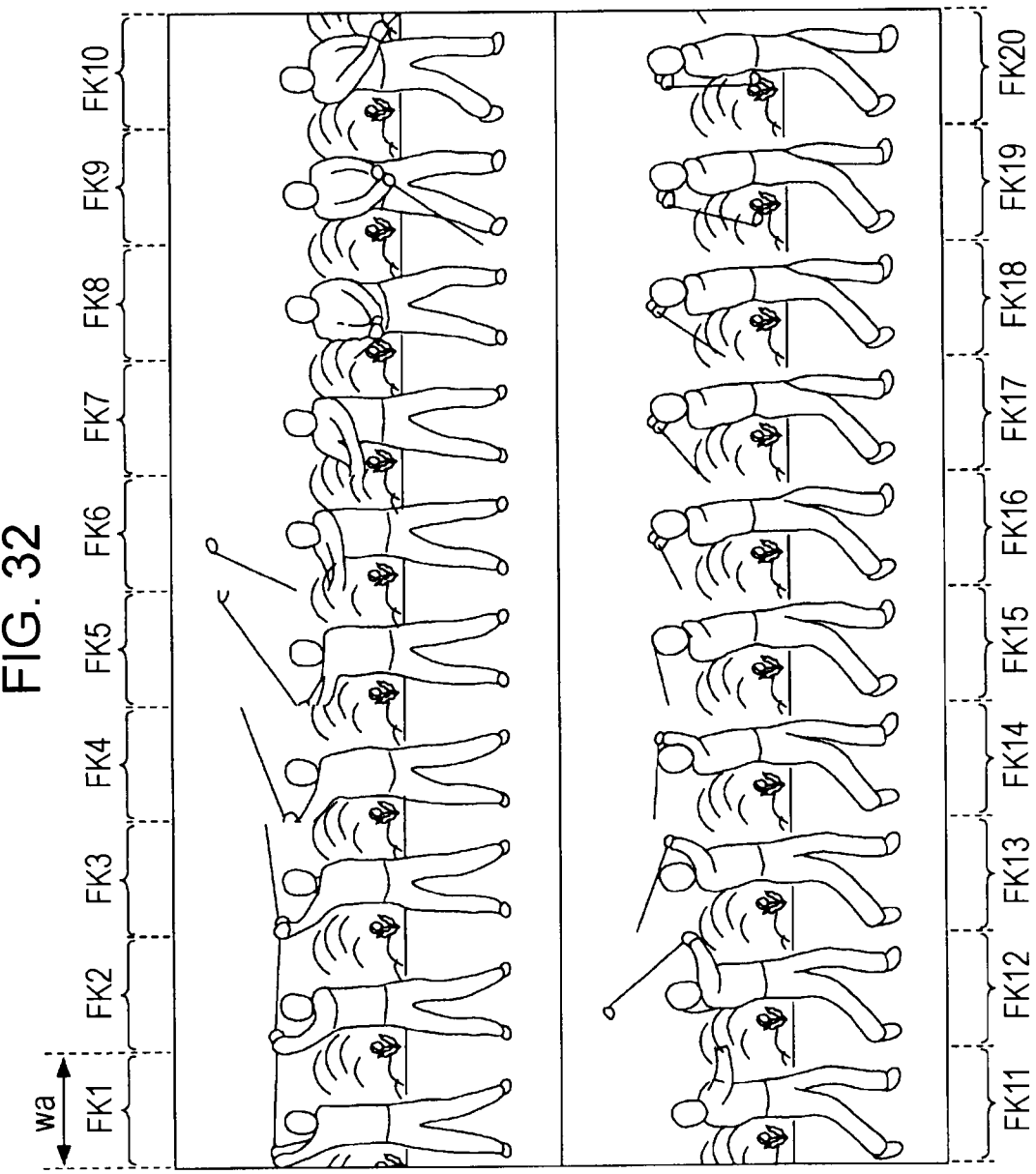
FIG. 32 illustrates an existing combined image.
Figure 33:
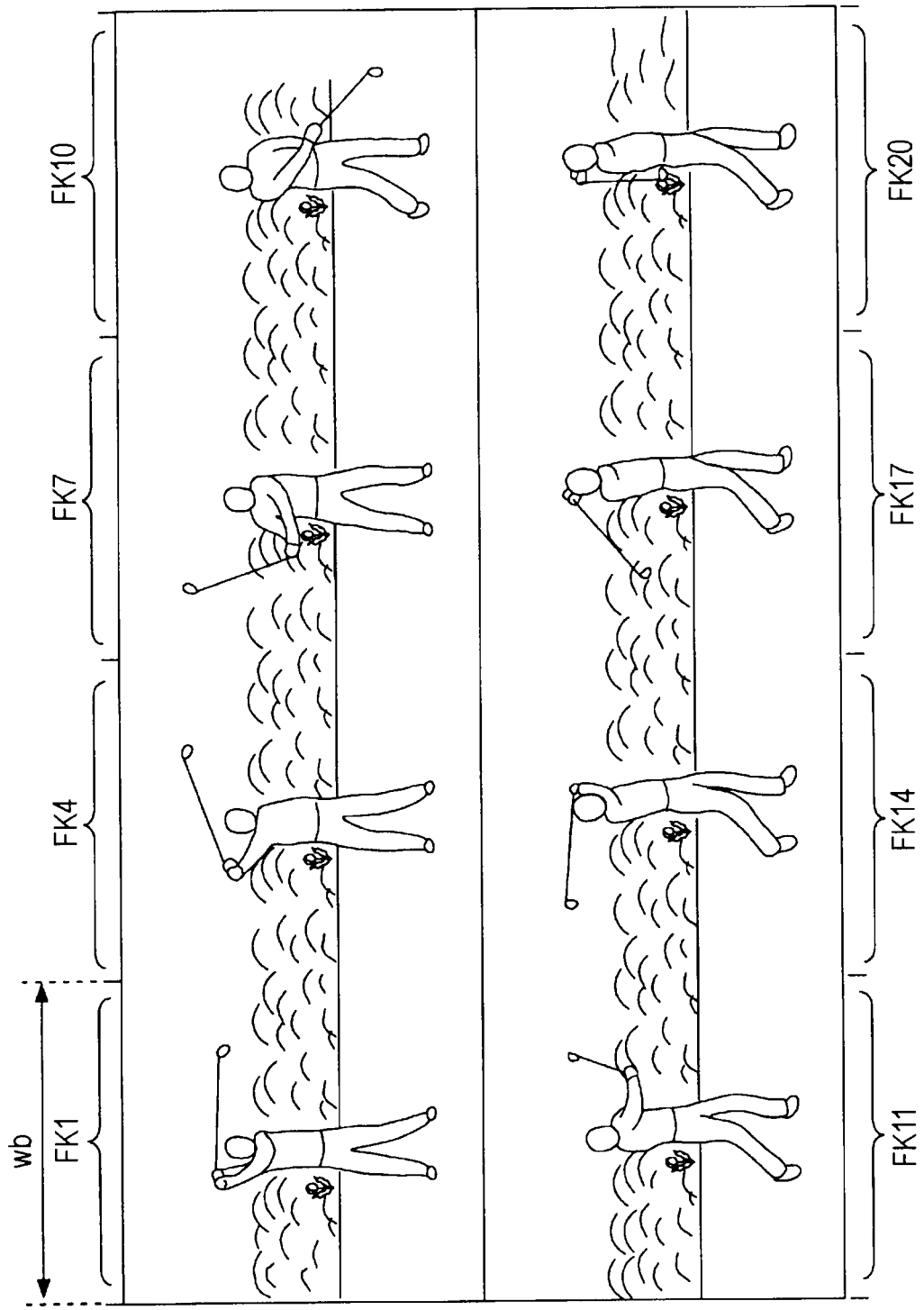
FIG. 33 illustrates an existing combined image.

Like the image illustrated in FIG. 32, the motion sequence still image shown in FIG. 2 is generated using a relatively large number of frame image data items so as to contain images captured at a plurality of times during a continuous golf swing. However, unlike the image illustrated in FIG. 32, the image of the top portion of the golf club is not missing, for example. Although images on the right and the left partially overlap, the entire moving subject (a human and a golf club) in each frame is shown. That is, the motion sequence image can sufficiently represent the motion using a plurality of frame images and appropriately represents the motion range of the moving subject. Such a motion sequence image can be generated through the following processing.

FIGS. 3A to 3C are schematic illustrations of a motion sequence still image generation process.

FIG. 3A is a schematic illustration of image data items input to the input image selection unit 2. For example, the image data items are moving image data items. Each of image data items F1, F2, F3, . . . represents frame image data.

The input image selection unit 2 selects key frames from among such time-series frames of the moving image. For example, assume that every fifth frame is a key frame. Then, the frames F1, F6, F11, F16, F21, . . . each indicated by a circle (o) are key frames. FIG. 3B represents images contained in these key frames.

As described in more detail below, when a motion sequence moving image is generated, the frame image data items other than the key frames (e.g., the frames F2 and F3) are also used for the combining process. However, when a motion sequence still image is generated, only the key frames are used for the combining process.

In such a case, the input image selection unit 2 extracts only the key frames and supplies the extracted key frames to the layer processing unit 3.

As described in more detail below, each time the layer processing unit 3 sequentially receives the key frames F1, F6, F11, F16, F21, . . . from the input image selection unit 2, the layer processing unit 3 sequentially performs a combining process. In this way, as shown in FIG. 3C, a motion sequence still image is finally generated. At that time, a layer combining process is performed so that the image of the moving subject contained in the current key frame to be combined overlaps with the previously combined image.

The processing performed by the layer processing unit 3 that combines images in this manner is described next.

The layer separating sub-unit 31 separates, using the moving subject information, each of the input image and the previous key frame image into a background image and an image of the moving subject in the range subjected to a layer combining process. Thus, the layer separating sub-unit 31 generates images in each of the layers.

FIG. 4A illustrates an input image (one of frame image data items) and the moving subject information regarding the frame image data item.

As mentioned earlier, the input image selection unit 2 selects frame image data items serving as key frames (e.g., the frame image data item F1) from among the frame image data items F1, F2, F3, . . . sequentially supplied from the image input unit 10. The input image selection unit 2 then outputs the selected frame image data items to the layer processing unit 3.

In addition, the input image selection unit 2 receives the moving subject information corresponding to each of the frame image data items supplied from the moving subject information generation unit 11 or the moving subject information input unit 12. When supplying the frame image data item serving as a key frame to the layer processing unit 3, the input image selection unit 2 further supplies the moving subject information corresponding to the frame image data item to the layer processing unit 3.

Such a frame image data item supplied to the layer processing unit 3 is illustrated in the upper section of FIG. 4A, and the moving subject information is illustrated in the lower section of FIG. 4A. In this example, the moving subject information is represented using a binary value. That is, a pixel of the image of the moving subject is represented as "1", and a pixel of the background image is represented as "0". In the lower section of FIG. 4A, each of the pixels of the white portion is represented as "1". That is, the pixels represent the moving object. Each of the pixels of the black portion is represented as "0". That is, the pixels represent the background.

The layer separating sub-unit 31 separates the input frame image data into layers using such moving subject information.

FIG. 4B illustrates a moving subject layer and a background layer generated by separating the input frame image data. The moving subject layer shown in the upper section of FIG. 4B contains an image obtained by extracting only a moving subject portion (i.e., only the pixels having moving subject information of "1") from the input image shown in FIG. 4A.

In addition, the background layer shown in the lower section of FIG. 4B contains an image obtained by extracting only a background portion (i.e., only the pixels having moving subject information of "0") from the input image shown in FIG. 4A.

Note that a plurality of moving subjects may appear. Accordingly, moving subject information of a multi-level value representing three values or more may be used. This is described in more detail below with reference to FIGS. 28 and 29. In the moving subject information generation unit 11 or the moving subject information input unit 12, moving subject information representing different values is generated (or acquired) in accordance with the depths of the plurality of moving subjects (a foreground/background relationship in the image).

In such a case, the layer separating sub-unit 31 can separate the image into the layers each corresponding to one of the depths.

As described above, the layer processing sub-unit 32 performs various processing on each of the separated layers into the form that can be combined.

In general, a motion sequence image is not generated from the entire area of input frame image data items, but from extracted areas of the input frame image data items.

In addition, a moving subject effective area is different from the region of the background remaining in the final image.

Figure 5A:
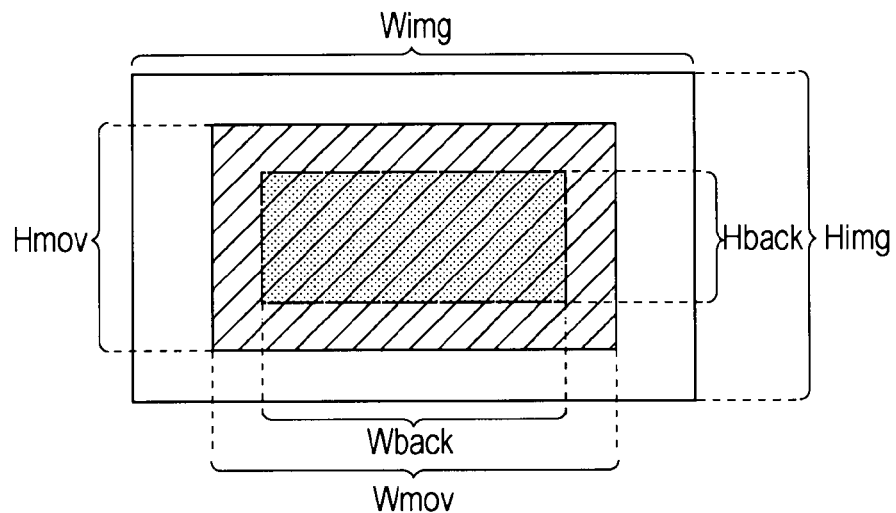
FIG. 5A, 5B, or 5C illustrates an example of region setting of an input image according to the embodiment.
Figure 5B:
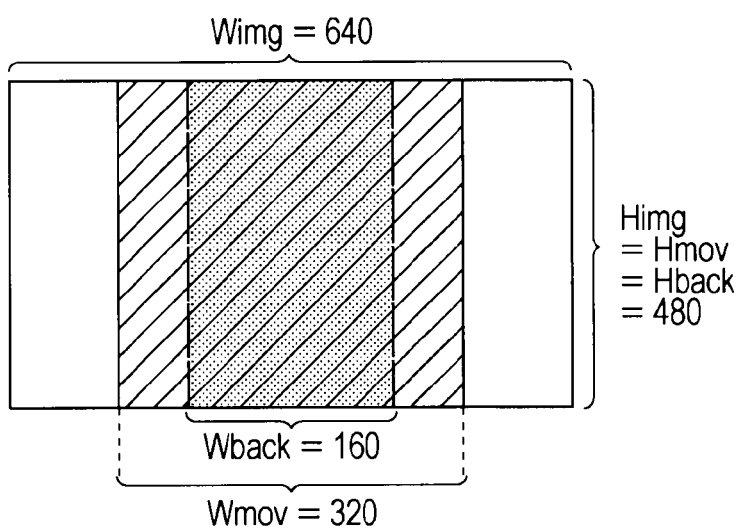
Figure 5C:
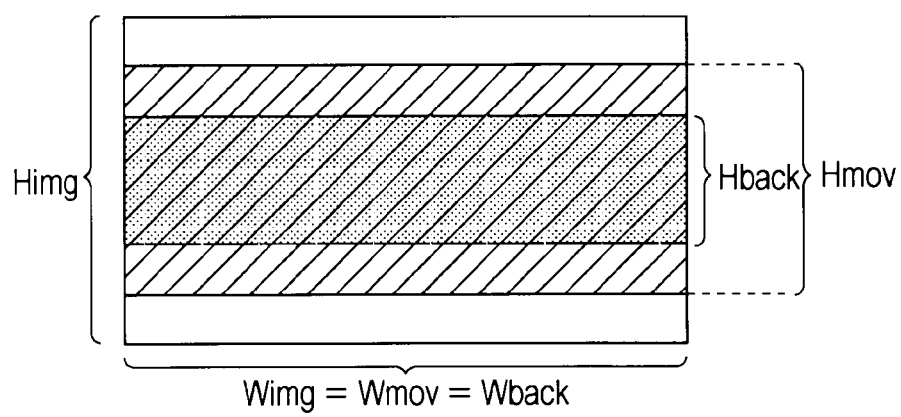

Let (Wimg, Himg) denote the width and height of the image representing the input frame image data. Let (Wmov, Hmov) denote the width and height of the motion sequence effective area, and let (Wback, Hback) denote the width and height of the remaining background area. Then, one of three cases suggesting a relationship between the regions arises, for example, as shown in FIG. 5A, 5B, or 5C. Note that FIGS. 5A, 5B, and 5C are only examples. The cases are not limited thereto.

In FIGS. 5A, 5B, and 5C, the moving subject effective area is an area from which the image of a main moving subject is extracted. The remaining background area is a region that is used as a background image in the combining process.

For the values (Wmov, Hmov) of the motion sequence effective area and the values (Wback, Hback) of the remaining background area, the values of the width or the values of the height may be the same in accordance with the subject motion direction, that is, a direction in which the image temporally moves when the motion sequence image is generated.

In general, it is desirable that when, as indicated by the motion sequence image shown in FIG. 2, the motion sequence effective areas are arranged in the horizontal direction, each of the heights Hmov and Hback is the same as the height of the original frame image data (Himg), as shown in FIG. 5B.

In contrast, in general, it is desirable that when the motion sequence effective areas are arranged in the vertical direction, each of the widths Wmov and Wback is the same as the width of the original frame image data (wimg), as shown in FIG. 5C.

In the case of checking of form in sports, when a target is a standing human, a horizontal motion sequence is frequently used. In contrast, when a target is a lying human, as in the case of groundwork of Judo, a vertical motion sequence is frequently used. As described above, the motion sequence direction and the size of each of the images significantly depends on an image to be captured.

Figure 6A:
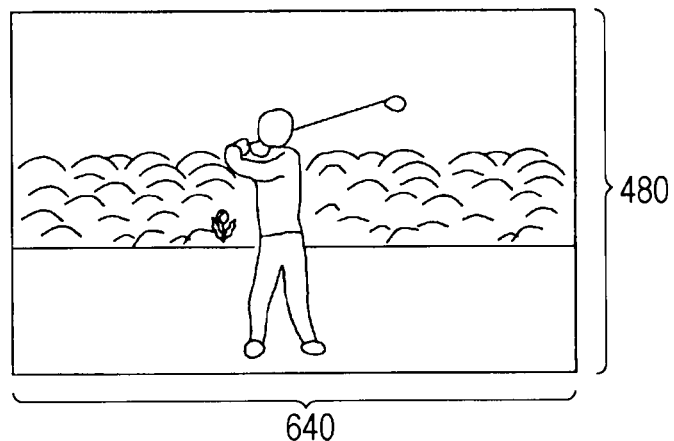
FIGS. 6A to 6C illustrate a motion sequence effective area and a remaining background area according to the embodiment.
Figure 6B:
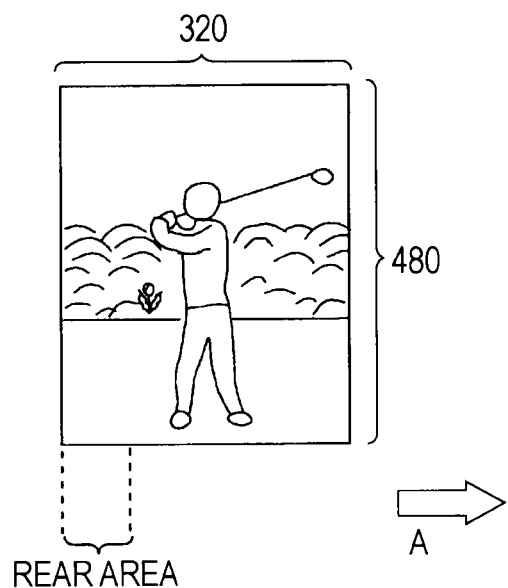
Figure 6C:
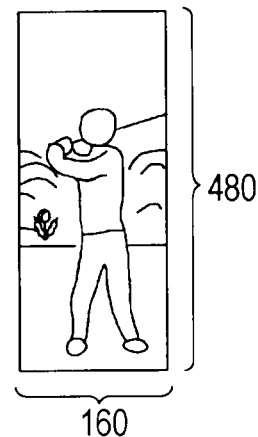

FIGS. 6A to 6C illustrate an example of the settings of a motion sequence effective area and a remaining background area for actual frame image data using the example shown in FIG. 5B.

FIG. 6A illustrates input original frame image data. For example, the size of the frame image data is a VGA size (640×480). The center of the motion sequence effective area and the center of the remaining background area are aligned with the center of the input original frame image data.

As shown in FIG. 6B, the motion sequence effective area has the following size: the width Wmov=320 and the height Hmov=480.

As shown in FIG. 6C, the remaining background area has the following size: the width Wback=160 and the height Hback=480.

Note that these values are only examples. In practice, appropriate values can be set in accordance with the size of the subject and the motion of the subject so that images used for the combining process are extracted.

For example, the layer combining sub-unit 33 combines the input image subjected to a process performed by the layer processing sub-unit 32 (the frame image data serving as the current key frame), the previous key frame image, the moving subject information, and an existing combined image data item at that time so as to generate an image to be output.

Note that the previous key frame image was input from the input image selection unit 2 and was previously used for the combining process. The previous key frame image may be stored in the layer processing unit 3 until the current processing has been started. Alternatively, the previous key frame image may be stored in the combined image update preserving unit 5 and may be read from the combined image update preserving unit 5 together with the previous combined image data item when the combining process is started.

The concept of the combining process of an input image (a current key frame) and the previous key frame is described next with reference to FIGS. 7A and 7B.

The current input key frame has been separated into a moving subject layer and a remaining background layer through the above-described processing performed by the layer separating sub-unit 31.

In addition, the previous key frame has been separated into a moving subject layer and a remaining background layer.

FIGS. 7A and 7B illustrate a combining process of these four layers.

As shown in FIG. 7A, the moving subject layer of the latest input frame image data (the current key frame) has top priority.

In addition, the moving subject layer of the frame image data generated through the previous combining process (the previous key frame) has a second priority.

In addition, the remaining background layer of the latest input frame image data (the current key frame) has a third priority.

In addition, the remaining background layer of the frame image data generated through the previous combining process (the previous key frame) has a fourth priority.

Thereafter, the four layer images are combined on the basis of the priorities so that a combined image as shown in FIG. 7B is obtained.

By combining such a combined image with a predetermined area of the existing combined image data item, a new moving subject image is added to the existing combined image including a plurality of previous key frames.

Figure 8:
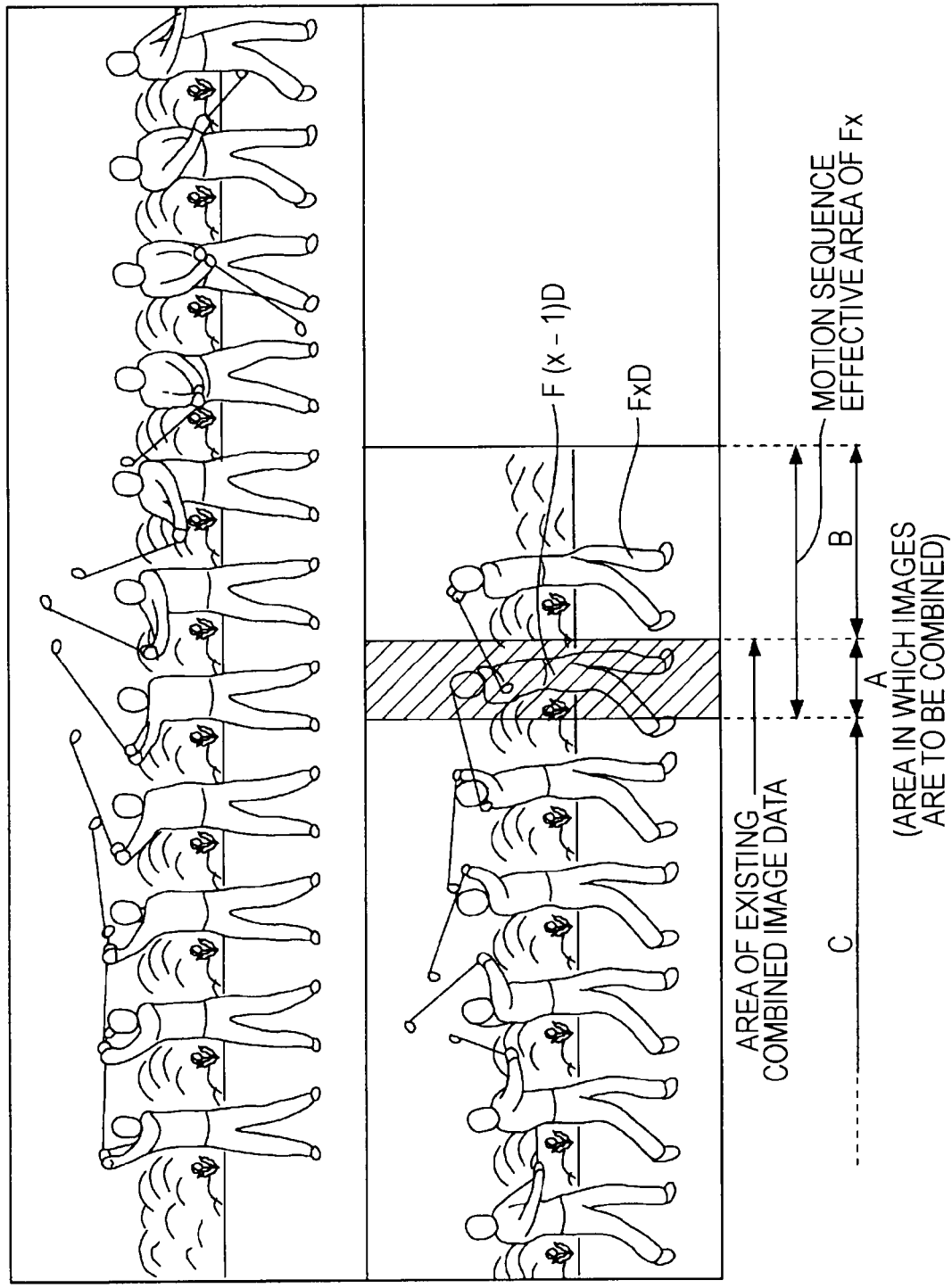
FIG. 8 illustrates a combining process in a first example of generation processing according to the embodiment.

For example, FIG. 8 illustrates a combined state at a certain time before a motion sequence still image is finally generated. That is, a combined state when the combining process is performed on a currently input key frame Fx is illustrated.

The motion sequence range of the current input key frame Fx and the area of the existing combined image data item are illustrated in FIG. 8.

In order to add the image of the currently input key frame Fx through the combining process, the pixels of the motion sequence effective area of the current input key frame Fx can be directly copied into an area B of the new combined image data item shown in FIG. 8.

In addition, the pixels of the existing combined image data item, that is, the pixels of the combined image data item obtained when the combining process of the previous key frame is completed can be copied into an area C of the new combined image data item.

In this case, a problem arises for the area A. That is, in the area A, the image of a moving subject FxD in the current key frame Fx partially overlaps with the image of a moving subject F(x−1)D in the previous key frame. Accordingly, for the area A, the layers are combined using the priorities as shown in FIG. 7A.

That is, for the area A, the layer combining sub-unit 33 combines the images using the current key frame Fx and the previous key frame, as shown in FIG. 7, so as to generate a combined image. For the area B, the image of the current key frame Fx corresponding to the area B is directly used. In this way, a combined image for the area (A+B) is obtained from the current key frame image and the previous key frame image. Subsequently, the layer combining sub-unit 33 combines the combined image for the areas A and B with the existing combined image data item read from the combined image update preserving unit 5. That is, the layer combining sub-unit 33 stitches the currently generated area (A+B) to the area C of the existing combined image data item.

In this way, the combined image data item shown in FIG. 8 can be obtained.

The obtained combined image data item is stored in the combined image update preserving unit 5 and is used in the next combining process for the next key frame F(x+1) in a similar manner.

In this way, for the area A in which the images are overlapped in the combining process, the layer combining process illustrated in FIGS. 7A and 7B is performed. Accordingly, the current key frame is added to the existing combined image data item without losing any part of the image of the moving subject FxD. As a result, as illustrated in FIG. 2, even when a plurality of key frames are used, a motion sequence image that optimally represents the motion of a moving subject can be generated.

A particular example of the processing performed by the image processing apparatus 1 is described next with reference to FIGS. 9 and 10.

Figure 9:
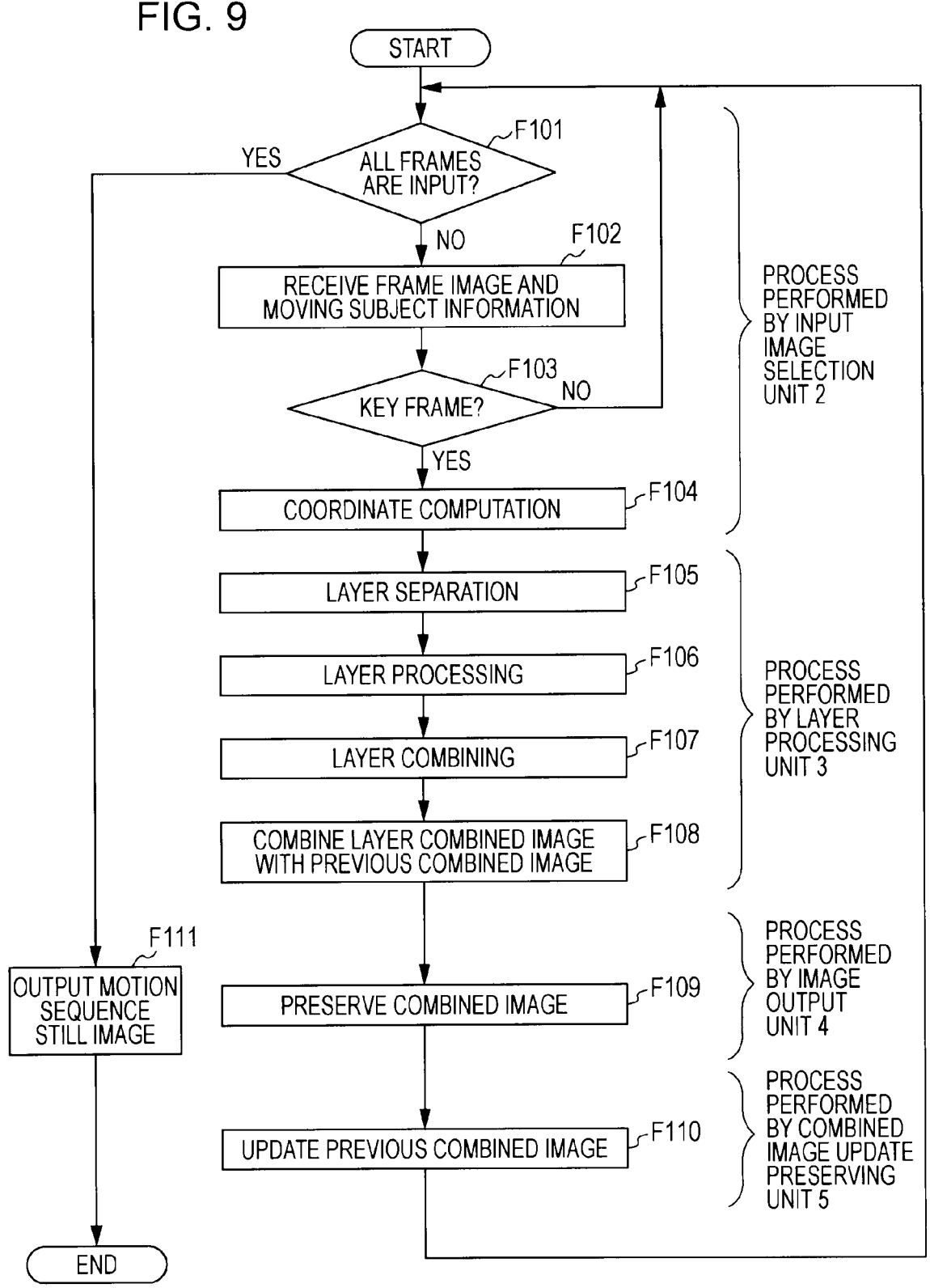
FIG. 9 is a flowchart of the combining process in the first example of generation processing according to the embodiment.

FIG. 9 is a flowchart of the processing performed by the input image selection unit 2, the layer processing unit 3, the image output unit 4, and the combined image update preserving unit 5 in order to generate a motion sequence still image.

Processing in steps F101 to F104 is performed by the input image selection unit 2.

As mentioned earlier, the input image selection unit 2 receives time-series frame image data items from the image input unit 10. Each time the input image selection unit 2 receives one of the frame image data items, the input image selection unit 2, in step F102, further retrieves the moving subject information corresponding to the received frame image data item from the moving subject information generation unit 11 (or the moving subject information input unit 12).

Note that, in step F101, it is determined whether all of a series of frame image data items that forms the motion sequence still image has been received, that is, it is determined whether supply of the frame image data items from the image input unit 10 is completed. That is, the processing proceeds from step F101 to step F102 until a predetermined number of key frames used for generating the motion sequence still image have been input.

After the input image selection unit 2 receives the frame image data item and the subject image information corresponding to the frame image data item in step F102, the input image selection unit 2, in step F103, determines whether the frame image data item is to be selected as a key frame. For example, when key frames are selected as illustrated in FIG. 3, every fifth frame (a first frame, a sixth frame, an eleventh frame . . . ) is selected as a key frame.

If the input frame image data item is selected as a key frame, the processing performed by the input image selection unit 2 proceeds to step F104. However, if the input frame image data item is not selected as a key frame, the processing returns to step F101, where the input image selection unit 2 receives the next frame image data item. That is, in the generation process of the motion sequence still image, the frame image data items other than key frames are not used for the combining process.

If the frame image data item received in step F102 is selected as a key frame, the input image selection unit 2 performs processing so that the received frame image data item can be used for the combining process. Accordingly, in step F104, the input image selection unit 2 performs coordinate computation. In the coordinate computation, the positions of pixels of the current frame image data item used when the current frame image data item is combined with the combined image are computed. That is, a pixel range within the size of a final combined image (the size of the motion sequence still image) into which the current frame image data is combined is computed.

The input image selection unit 2 outputs the coordinates computed in step F104 to the layer processing unit 3 together with the current frame image data item (the current key frame) and the moving subject information.

In step F105, the layer separating sub-unit 31 of the layer processing unit 3 generates four layers using the received frame image data item (the current key frame), the received moving subject information, the previous key frame image, and the moving subject information regarding the previous key frame image. That is, as illustrated in FIGS. 4A and 4B, the layer separating sub-unit 31 separates the input frame image data item into a moving subject layer and a background layer. Subsequently, as shown in FIG. 7A, the layer separating sub-unit 31 generates the moving subject layer of the current key frame, the moving subject layer of the previous key frame, the background layer of the current key frame, and the background layer of the previous key frame.

Note that the moving subject layer and the background layer that were generated in the layer separation process performed in step F105 when the previous key frame was input and that was stored can be used for the current processing.

When the four layers are generated, the layer images shown in FIG. 7A may be generated and stored in a memory area. However, in this example, the four layers are generated by generating "layer separation information".

The layer separation information indicates which one of the layers is finally selected as an overlapping portion of the motion sequence effective areas of the previous key frame image and the current key frame image, that is, as the pixels of an area to be combined illustrated in FIG. 8.

Figure 10:
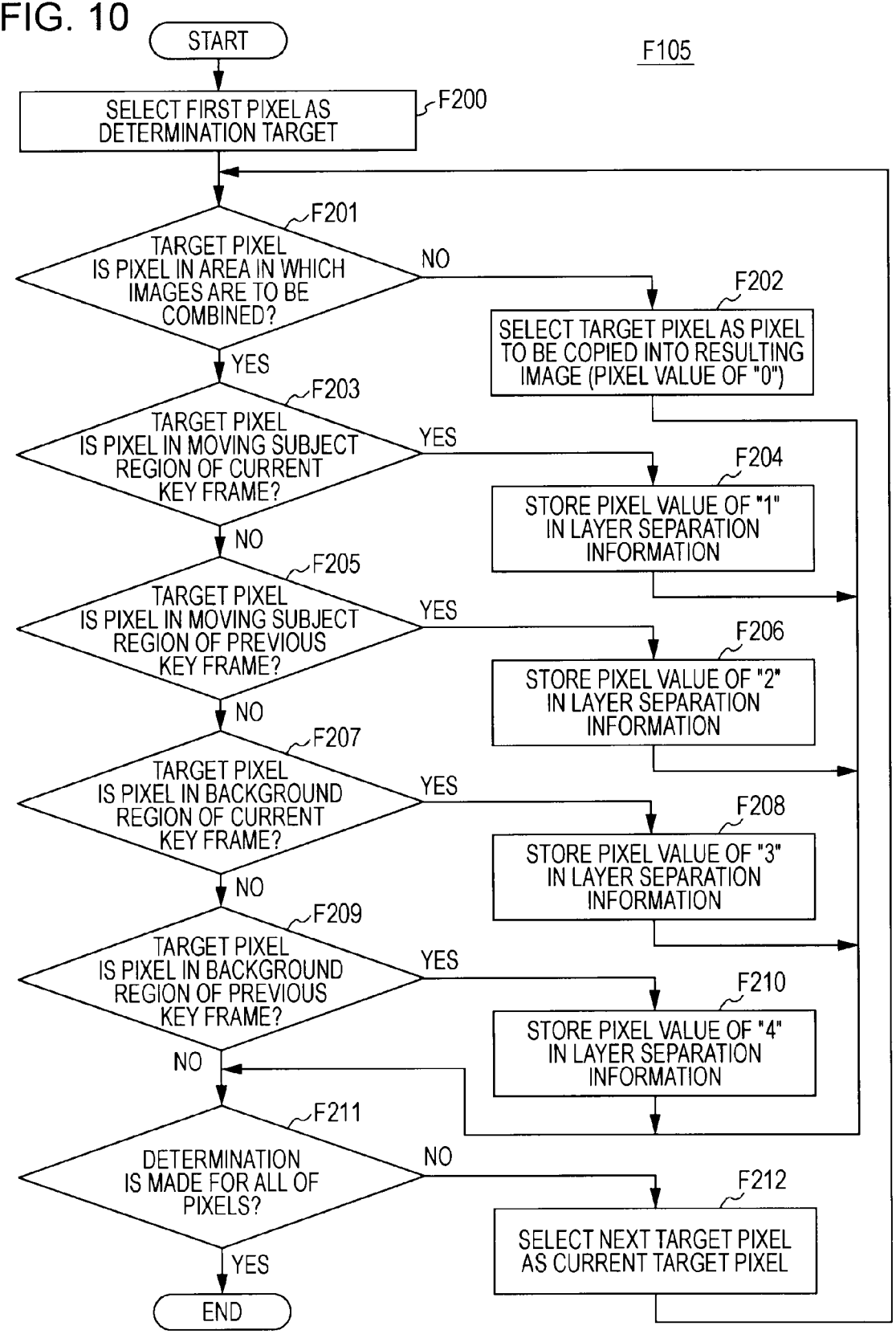
FIG. 10 is a flowchart of a layer separation process in the first example of generation processing according to the embodiment.

This processing is illustrated in FIG. 10. In the processing illustrated in FIG. 10, each of all of the pixels of the motion sequence effective area in the current key frame becomes a target of a determination process.

In step F200, the layer processing unit 3 selects a first pixel of the motion sequence effective area of the current key frame as a determination target. Thereafter, determination processes in steps F201 to F210 are performed on the target pixel.

Until the determination process has been completed for all of the pixels of the motion sequence effective area in the current key frame in step F211, the determination processes in steps F201 to F210 are performed on the target pixel while selecting the next target pixel as the current target pixel in step F212.

In step F201, the layer processing unit 3 determines whether the target pixel is a pixel in an area in which images are to be combined.

If the target pixel is not a pixel in the area in which images are to be combined, the processing proceeds to step F202, where the layer processing unit 3 selects the target pixel of the motion sequence effective area in the current key frame as a pixel to be copied into a combining result image (a layer combined image). For example, a pixel value of "0" is stored in the layer separation information for the target pixel. Thereafter, the processing proceeds to step F211.

For example, for the pixels corresponding to the area B shown in FIG. 8, the processing proceeds from step F201 to step F202.

However, if the target pixel is a pixel in the region to be combined, the processing proceeds to step F203, where the layer processing unit 3 determines whether the target pixel is a pixel in the moving subject region of the current key frame. If the target pixel is a pixel in the moving subject region of the current key frame, the processing proceeds to step F204, where the layer processing unit 3 stores a pixel value of "1" in the layer separation information for the target pixel. Thereafter, the processing proceeds to step F211. The pixel value "1" indicates "top priority", as shown in FIG. 7A.

For example, for the pixels in the moving subject region of the current key frame, that is, the pixels in the area A (the region to be combined) shown in FIG. 8 (e.g., the pixels of the top portion of the golf club), the processing proceeds from step F203 to step F204.

However, if, in step F203, it is determined that the target pixel is not a pixel in the moving subject region of the current key frame, the processing proceeds to step F205, where the layer processing unit 3 determines whether the target pixel corresponds to the moving subject region of the previous key frame. If the target pixel corresponds to the moving subject region of the previous key frame, the processing proceeds to step F206, where the layer processing unit 3 stores a pixel value of "2" in the layer separation information for the target pixel. Thereafter, the processing proceeds to step F211. The pixel value "2" indicates the "second priority", as shown in FIG. 7A.

For example, for the pixels in the moving subject region of the previous key frame, that is, the pixels in the area A (the region to be combined) shown in FIG. 8 (e.g., the pixels that form the moving subject F(x−1)D), the processing proceeds from step F205 to step F206.

However, if, in step F205, it is determined that the target pixel is not a pixel in the moving subject region of the previous key frame, the processing proceeds to step F207, where the layer processing unit 3 determines whether the target pixel corresponds to the background region of the current key frame. If the target pixel corresponds to the background region of the current key frame, the processing proceeds to step F208, where the layer processing unit 3 stores a pixel value of "3" in the layer separation information for the target pixel. Thereafter, the processing proceeds to step F211. The pixel value "3" indicates the "third priority", as shown in FIG. 7A.

However, if, in step F207, it is determined that the target pixel is not a pixel in the background region of the current key frame, the processing proceeds to step F209, where the layer processing unit 3 determines whether the target pixel is a pixel in the background region of the previous key frame. If the target pixel is a pixel in the background region of the previous key frame, the processing proceeds to step F210, where the layer processing unit 3 stores a pixel value of "4" in the layer separation information for the target pixel. Thereafter, the processing proceeds to step F211. The pixel value "4" indicates the "fourth priority", as shown in FIG. 7A.

The above-described processing is performed until it is determined in step F211 that the determination made for all of the pixels of the motion sequence effective area of the current key frame is completed.

The four layers of the area to be combined, as shown in FIG. 7A, are, from the bottom, a "background layer of the previous key frame image with a fourth priority", a "background layer of the previous key frame image with a fourth priority", a "remaining background layer of the current key frame image with a third priority", a "moving subject layer of the previous key frame image with a second priority", and a "moving subject layer of the current key frame image with top priority". These layers are sequentially stacked from the bottom and are viewed from the top. In this way, an output image is generated. That is, the upper layer has a priority. Accordingly, when effective pixels are contained in the upper layer of two layers, the lower layer has no effect regardless of whether the pixels of the lower layer are effective or not and whether the pixels of the lower layer have any pixel values.

Through the processing illustrated in FIG. 10, the layer separation information contains an effective layer number for each of the pixels in the region to be combined.

For example, when the pixel value of a pixel in the layer separation information is "1", a pixel extracted from the moving subject layer of the current key frame image having top priority is placed at the position of the pixel in the resulting image.

In addition, for example, when the pixel value of a pixel in the layer separation information is "2", a pixel extracted from the moving subject layer of the previous key frame image having a second priority is placed at the position of the pixel.

That is, each of the layers shown in FIG. 7A is represented in accordance with the layer separation information.

Subsequently, in step F106 shown in FIG. 9, the layer processing sub-unit 32 of the layer processing unit 3 processes the image. That is, the layer processing sub-unit 32 performs processing necessary for combining the layers. Examples of the processing include enlarging or reducing the image in accordance with the size of the input image and the size of an image generated from the input image in the combined image and rotating the image. If the pixels of the input image are directly included in the combined image, the enlarging or reducing operation or the rotating operation may be unnecessary.

In step F107, the layer processing unit 3 combines the layers. In this processing, the current key frame and the previous key frame are combined so that a layer combined image is generated. As used herein, the term "layer combined image" refers to the image in the area (A+B) shown in FIG. 8.

For the pixels having a pixel value of "0" selected in step F202 shown in FIG. 10, that is, the pixels in the area B shown in FIG. 8, the pixels extracted from the current key frame are copied into the layer combined image.

The layer combining operation is performed on each of the pixels in the region to be combined (i.e., the area A).

In such a case, the layer separation information is referred to for each of the pixels. For the positions of the pixels having a pixel value of "1", the corresponding pixels are extracted from the current key frame and are copied to the layer combined image at the positions. For the positions of the pixels having a pixel value of "2", the corresponding pixels are extracted from the previous key frame and are copied to the layer combined image at the positions.

For the positions of the pixels having a pixel value of "3", the corresponding pixels are extracted from the current key frame and are copied to the layer combined image at the positions. In addition, for the positions of the pixels having a pixel value of "4", the corresponding pixels are extracted from the previous key frame and are copied to the layer combined image at the positions.

As described above, the layer separation information includes the information indicating which one of the four layers is selected and the pixel in the selected layer is used for each of the pixel positions. Accordingly, for each of the positions, a pixel is extracted from the current key frame or the previous frame in accordance with the pixel value in the layer separation information, and the extracted pixel is placed at the position. In this way, for the region to be combined shown in FIG. 8, a combining operation is performed in accordance with the priorities shown in FIGS. 7A and 7B.

Through the above-described processing, a layer combined image corresponding to the area (A+B) shown in FIG. 8 is generated. As shown in FIG. 8, in the layer combined image, the moving subject FxD of the current key frame Fx partially overlaps with the moving subject F(x−1)D of the previous key frame, and the moving subject FxD of the current key frame Fx is represented without losing any image.

Note that, in the layer combining process, top priority is given to the moving subject layer of the current key frame. Accordingly, in an overlapping portion of the current moving subject image and the previous moving subject image, top priority is given to the current moving subject image (i.e., the moving subject image in the latest frame) at all times.

In step F108, the layer processing unit 3 combines the layer combined image with the existing previous combined image. The existing previous combined image data item is stored in the combined image update preserving unit 5. Accordingly, the layer processing unit 3 reads the existing previous combined image data item from the combined image update preserving unit 5 and combines the layer combined image generated in step F107 with the existing previous combined image data item.

For example, as shown in FIG. 8, at that time, the existing previous combined image data item contains the key frames in the areas C and A which are combined together. Subsequently, the layer combined image in the areas A and B is copied to such combined image data item. Accordingly, the image in the area A is overwritten with the layer combined image. In this way, the combined image data item as shown in FIG. 8 is generated.

In step F109, the generated combine image data is transferred from the layer processing unit 3 to the image output unit 4. Upon receiving the combine image data, the image output unit 4 supplies the received combine image data to the combined image update preserving unit 5.

In step F110, the combined image update preserving unit 5 stores the supplied combine image data, which is to be used as existing combined image data item in the next combining process. That is, the combined image update preserving unit 5 replaces the existing combined image data item with the currently generated combined image data item.

Thereafter, the processing returns to step F101, where the process for the next frame image data starts.

In the example shown in FIG. 9, the layers are combined in step F107. Subsequently, the layer combined image is combined with the existing combined image data item in step F108. Note that, in the processing performed when a first key frame is input, the combining process is not necessary. At that time, existing combined image data item is not found.

In such a case, in steps F107 and F108, the pixels of an image in the first key frame are copied into the upper right region of the combined image data item having a size as shown in FIG. 8 so that a first combined image data item is generated. In step F110, the generated combined image data item is stored in the combined image update preserving unit 5.

After a second key frame is input, the previous key frame and the existing combined image are found. Therefore, the above-described processing can be performed.

In order to generate a combined image data item, various processing other than that illustrated in steps F107 and F108 can be performed. For example, for the pixels in the area B, the pixels may be copied into the existing combined image data item first. Subsequently, a layer combined image for the area A may be generated, and the generated combined image may be copied (overwritten) to the area A of the existing combined image data item.

By repeating the above-described processing performed in steps F101 to F110 each time a key frame is input, the final combined image data item can be obtained, as shown in FIG. 2.

At that time, in step F101, it is determined that all of the frames are input. Accordingly, the processing proceeds to step F111, where the image output unit 4 outputs the currently stored combined image data item (i.e., the combined image data item as shown in FIG. 2) to the output device 40 in the form of motion sequence still image data.

In this way, the image processing apparatus 1 according to the present embodiment generates one motion sequence still image data item and outputs the motion sequence still image data item.

As described above, according to the present embodiment, when a motion sequence still image is automatically generated, optimal representation of a moving subject due to expansion of a movable range and precise representation of time-series motion sequence due to arrangement of a large number of the images of the moving subject can be realized.

In particular, by combining the layers, each of the moving subject images can be optimally represented without losing, for example, the image of the top portion of a golf club. In addition, since a large number of the images of the moving subject can be arranged, the motion sequence at short time intervals can be represented.

Accordingly, for example, the form of a human playing a sport, a complicated motion of a wild animal, or a natural phenomenon occurring in a laboratory can be easily obtained. In addition, since a manual operation, such as a cut-and-paste operation of an image data, is not necessary, the load of a user can be advantageously reduced.

Furthermore, any image processing apparatus that can acquire a plurality of frame image data items obtained by capturing an image using an image pickup apparatus that can capture continuous still images or a moving image can be used as the image processing apparatus 1. For example, the image processing apparatus 1 may be incorporated in an image pickup apparatus or a reproducing apparatus for reproducing a plurality of captured frame image data. Alternatively, the image processing apparatus 1 may be incorporated in an apparatus that receives a plurality of transmitted captured frame image data.

Accordingly, for example, the image processing apparatus 1 can be widely applied to a cell phone, a personal digital assistant (PDA), a personal computer, a video playback apparatus, or a video editing apparatus.

3. Second Example of Processing for Generating Motion Sequence Image

A second example of processing for generating a motion sequence image mainly performed by the input image selection unit 2, the layer processing unit 3, the image output unit 4, and the combined image update preserving unit 5 is described below.

In this example, a motion sequence moving image as shown in FIGS. 11 to 20 is generated. Particular processing examples are described with reference to FIGS. 21 to 27.

Note that only a combining method used in an exemplary generation process of the second example described below is different from that of the first example. The generated motion sequence image may be a still image or a moving image.

Figure 30:
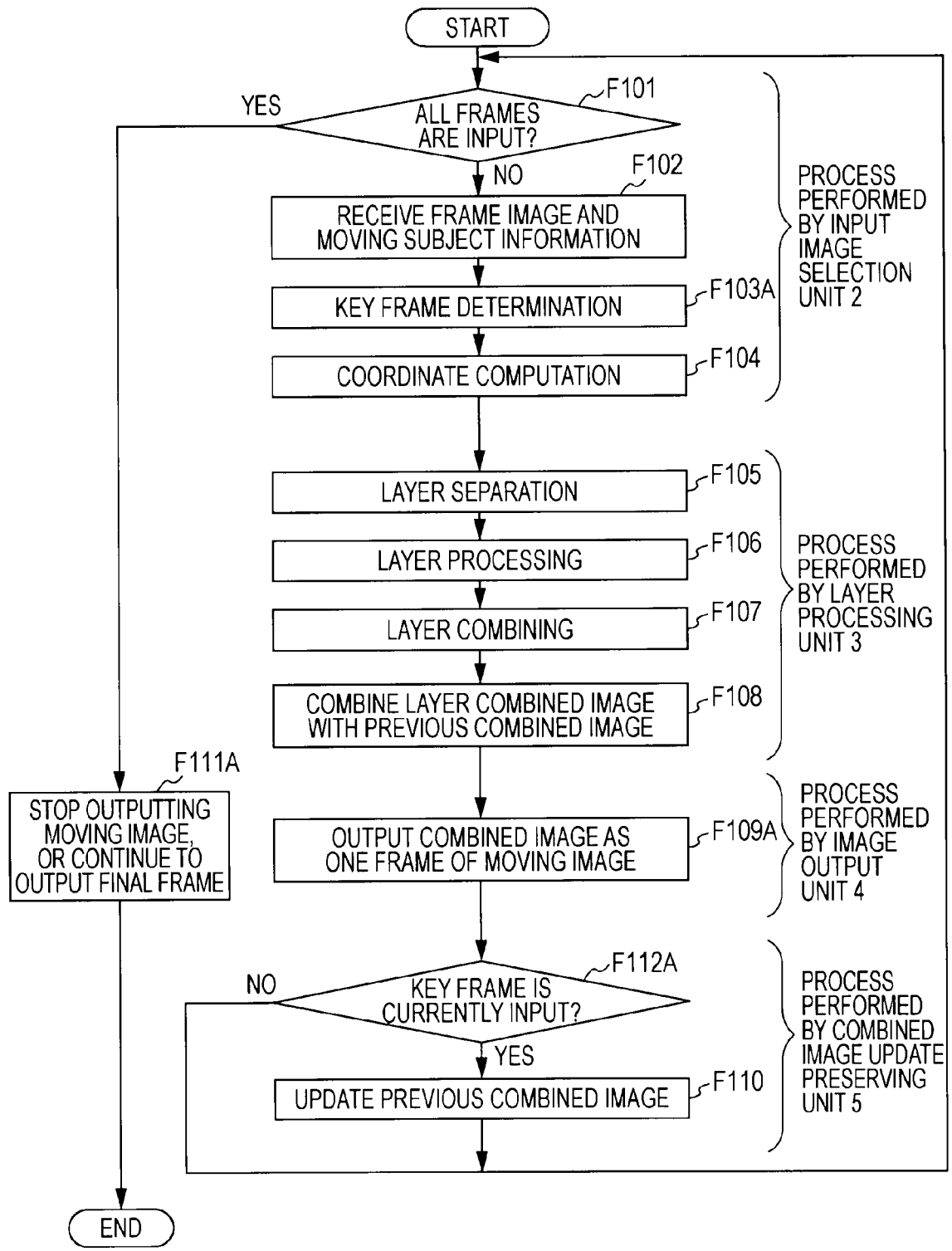
FIG. 30 is a flowchart of a process performed when the first example of generation processing is applied to a motion sequence moving image.
Figure 31:
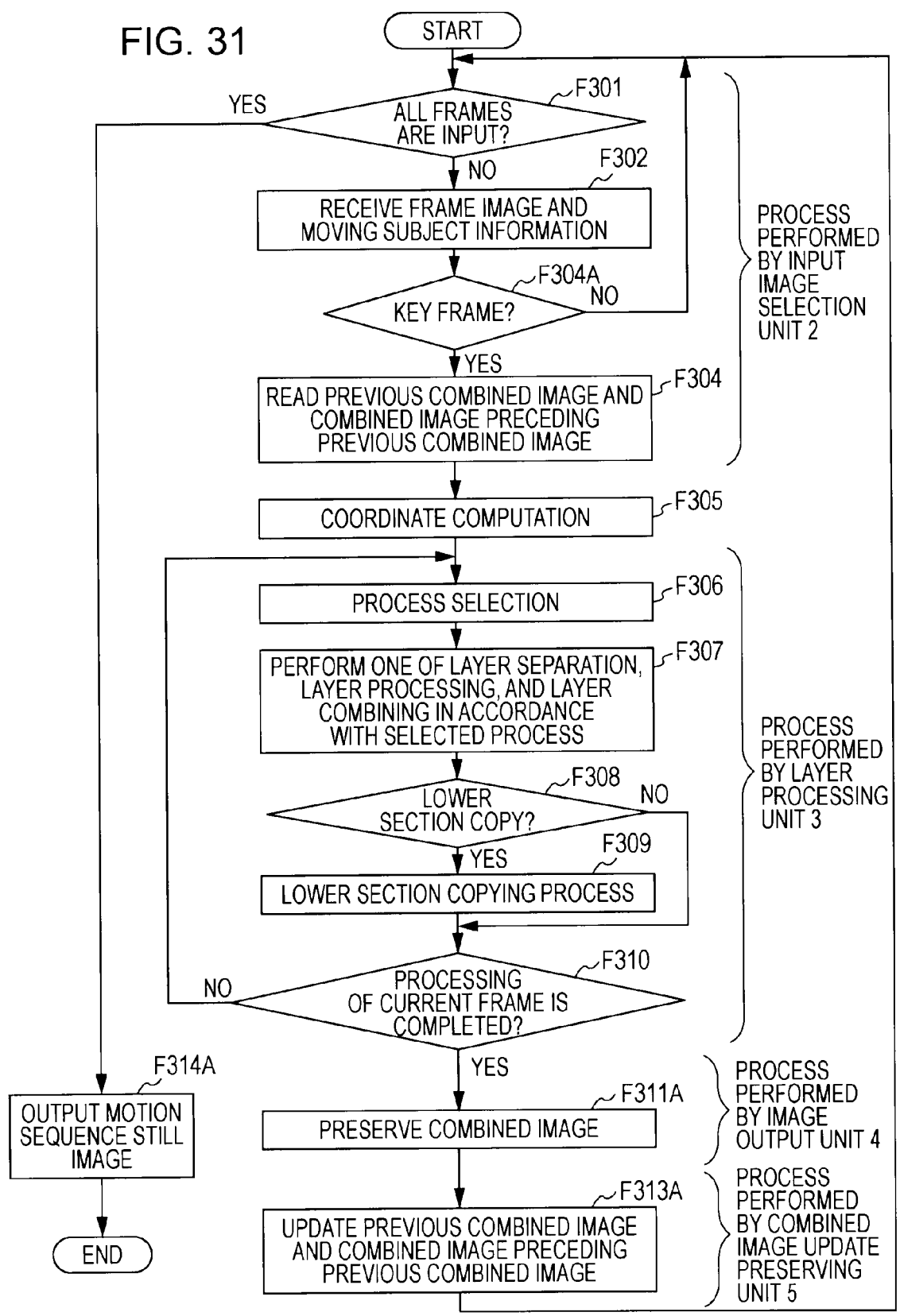
FIG. 31 is a flowchart of a process performed when the second example of generation processing is applied to a motion sequence still image.

As illustrated in FIGS. 30 and 31, a motion sequence moving image can be generated using the first example of generation processing. In addition, a motion sequence still image can be generated using the second example of generation processing described below.

A motion sequence moving image generated by the image processing apparatus 1 used in this example is described next.

In the case of a still image described above, only key frames are used. However, in the case of a moving image, frames other than the key frames are also used. Note that key frames are included in a final composed image, and frames other than the key frames are temporarily included in an output image (a moving image). Also, note that key frames are selected from among frame image data items as illustrated in FIG. 3.

Figure 11:
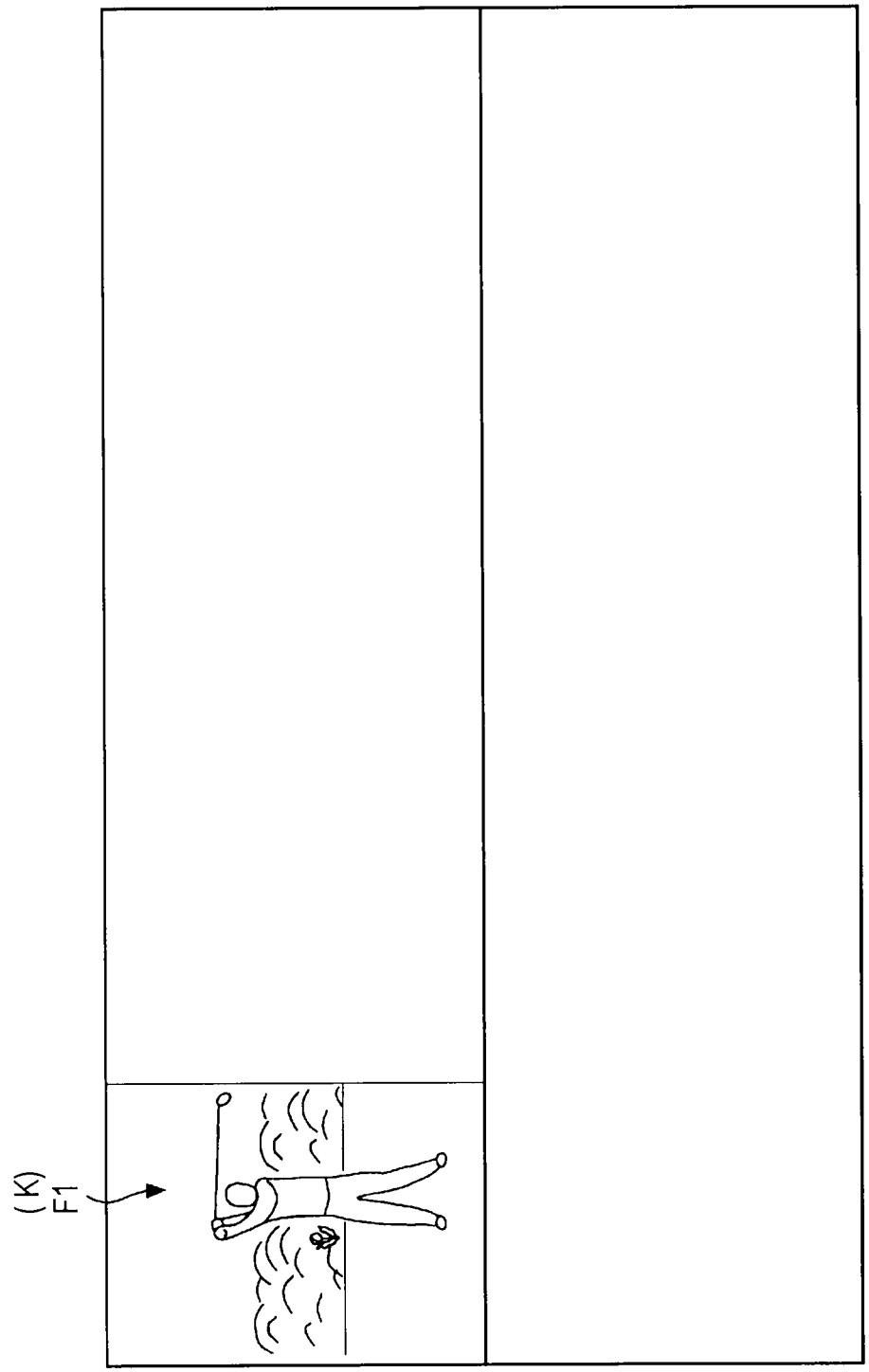
FIG. 11 illustrates a motion sequence moving image according to the embodiment.

FIG. 11 illustrates a combined image data item of when a first frame image data item (e.g., a key frame) F1 is input. In FIGS. 11 to 17, key frames are indicated by the symbol "(k)".

Figure 12:
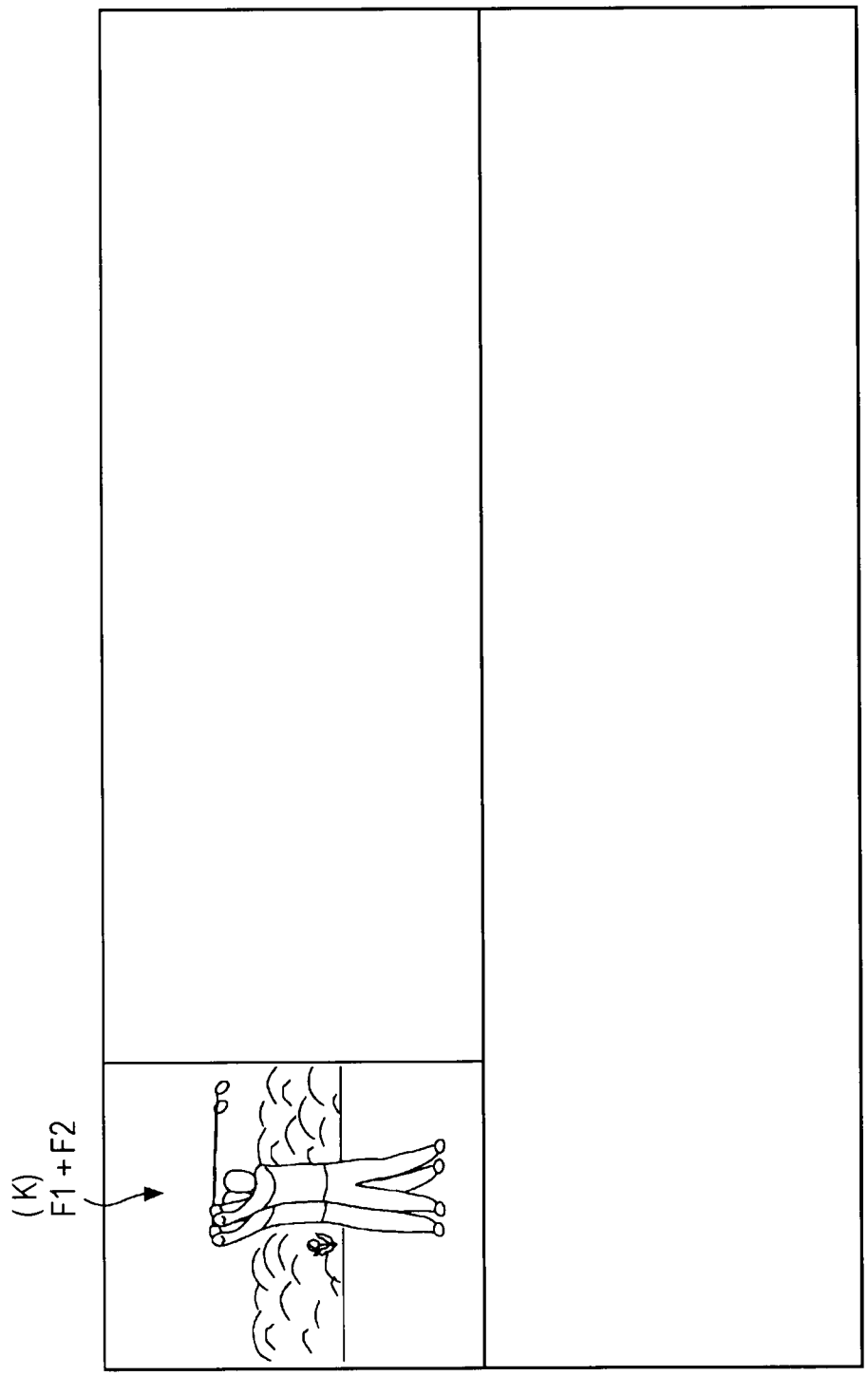
FIG. 12 illustrates a motion sequence moving image according to the embodiment.

FIG. 12 illustrates a combined image data item of when a second frame image data item F2 that is not a key frame (hereinafter referred to as a "non-key frame") is input. In this case, the non-key frame F2 is combined into a pixel range shifted from the key frame F1 by a predetermined distance. If moving subjects partially overlaps, top priority is given to the latest frame at all times, as in the above-described first example of generation processing.

In an image combining process, an input frame image data item is combined with the existing combined image data item. When the non-key frame F2 is combined, the existing combined image data item is the combined image data item as illustrated in FIG. 11.

Figure 13:
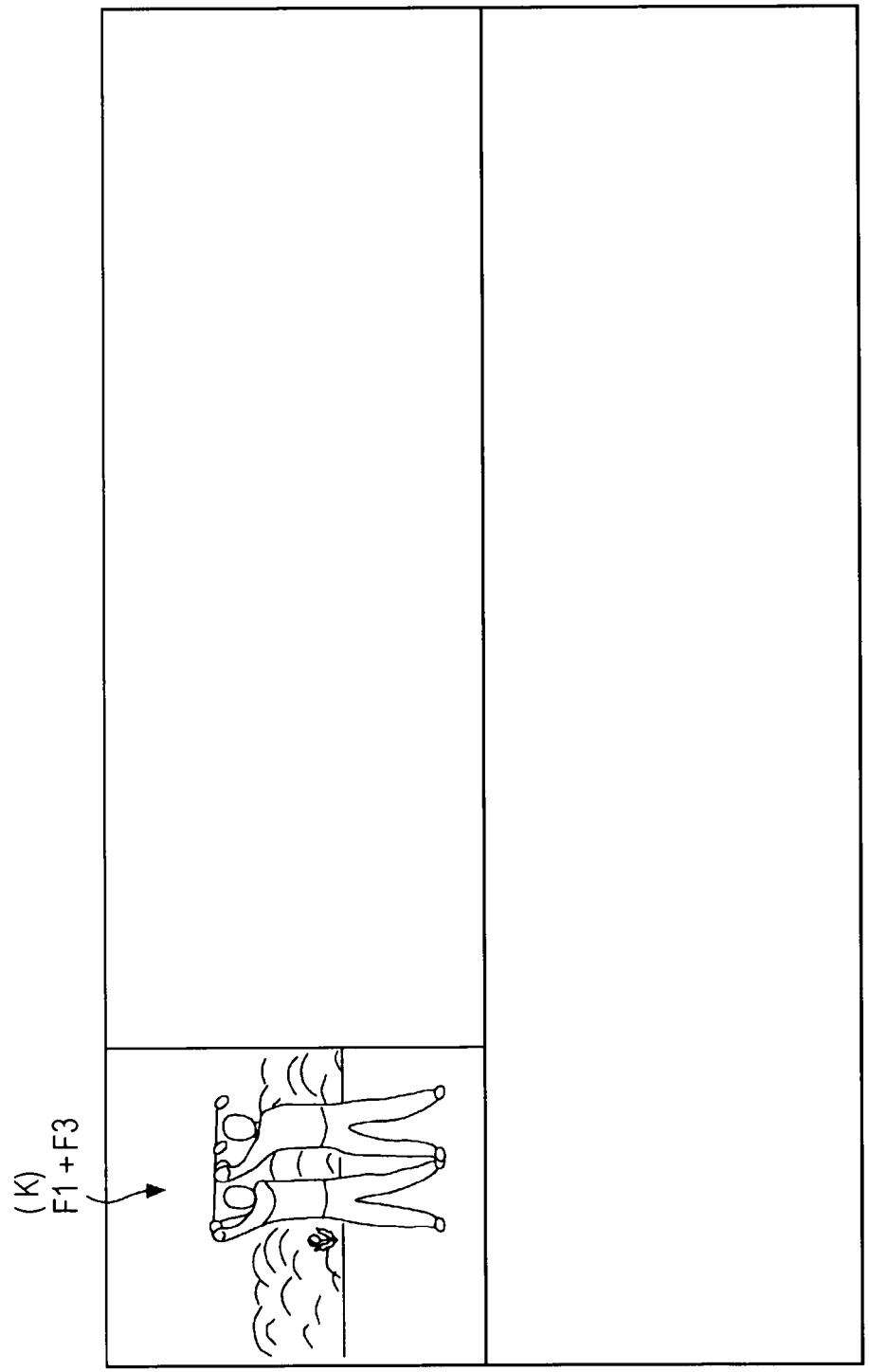
FIG. 13 illustrates a motion sequence moving image according to the embodiment.

FIG. 13 illustrates a combined image data item of when a third non-key frame F3 is input. In this case, the non-key frame F3 is combined into a pixel range shifted from the non-key frame F2 shown in FIG. 12 by a predetermined distance.

As noted above, in the image combining process, an input frame image data item is combined with the existing combined image data item. However, when a non-key frame is input, the combined image data item at that time is not used as an existing combined image data item.

Accordingly, when the non-key frame F3 is input, the existing combined image data item is still the combined image data item shown in FIG. 11.

That is, the previous non-key frame F2 is not used for the combining process, and the non-key frame F3 is combined with the combined image data item existing at that time. Accordingly, the moving subjects in the frame image data items F1 and F3 appear in the image, as shown in FIG. 13.

Although not shown, when a fourth non-key frame F4 is input, a combined image data item of the key frame F1 and the non-key frame F4 is generated in a similar manner. Furthermore, when a fifth non-key frame F5 is input, a combined image data item of the key frame F1 and the non-key frame F5 is generated in a similar manner. That is, in either case, the input frame image data is combined with the combined image data item existing at that time.

Similarly, when a key frame F6 is input, the key frame F6 is combined with the existing combined image data item.

Figure 14:
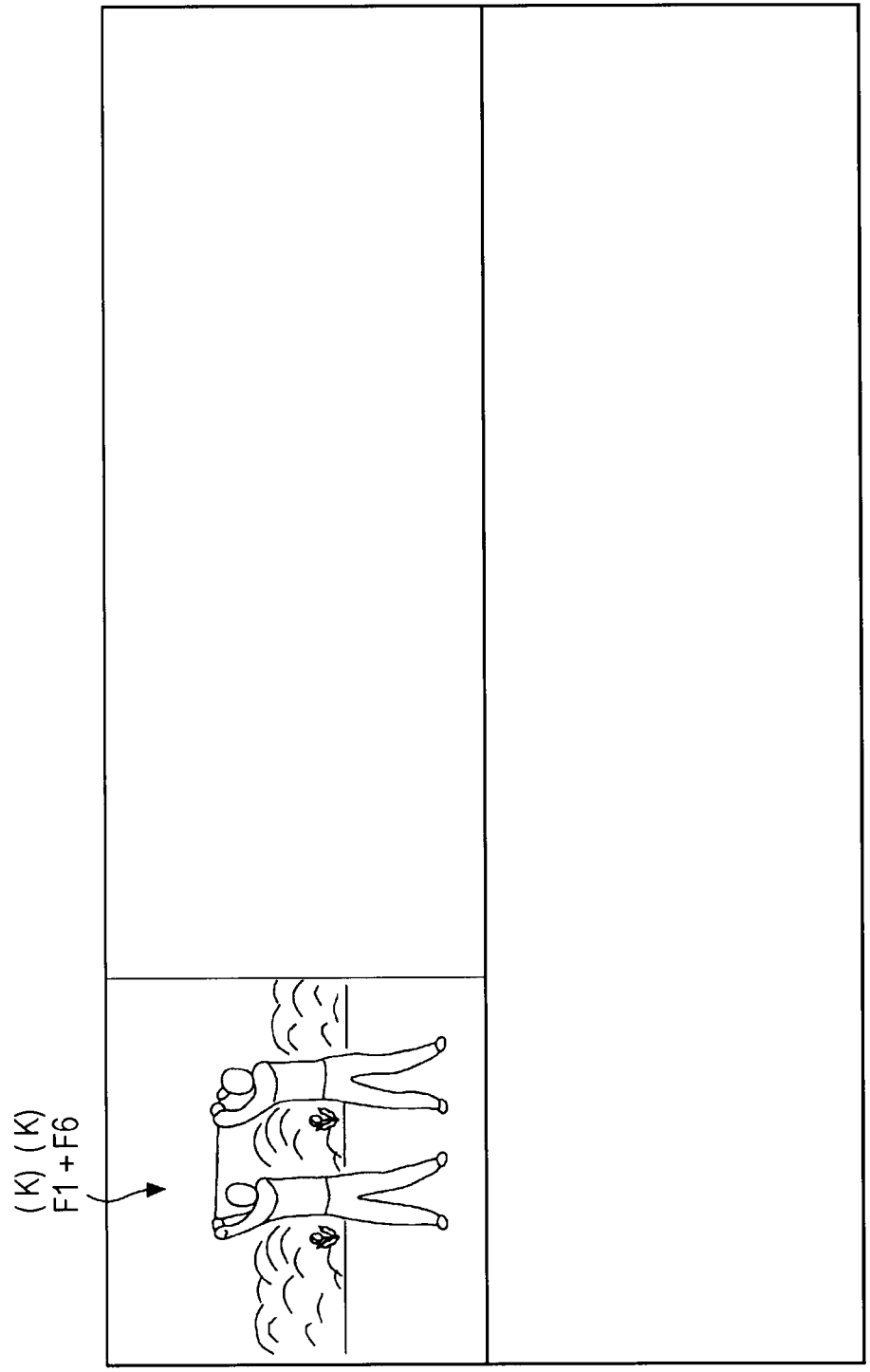
FIG. 14 illustrates a motion sequence moving image according to the embodiment.

FIG. 14 illustrates combined image data item generated when the second key frame F6 is input. The key frame F6 is combined with the existing combined image data item (only the key frame F1 in this case).

However, at that time, the combined image data item shown in FIG. 14 is stored as the existing image data item.

In addition to the combined image data item generated when an immediately previous key frame is input (i.e., the previous combined image data item), the combined image data item generated when the key frame preceding the immediately previous key frame is input (i.e., the combined image data item before last) may be used.

For example, in the following particular processing example, the previous combined image data item and the combined image data item before last are used. Accordingly, in this example, the previous combined image data item and the combined image data item before last are also used.

Note that the existing combined image is used in order to perform a combining process while assigning a priority to each of the pixels. Accordingly, how many previously combined image data items are used can be determined in accordance with the overlap level of the moving subjects. For example, a second combined image data item before last and a third combined data item before last may be used in the combining process.

After the combined image data item shown in FIG. 14 is generated, the previous combined image data item (the combined image data item shown in FIG. 14) and the combined image data item before last (the combined image data item shown in FIG. 11) are stored so as to be used for the later combining process.

Figure 15:
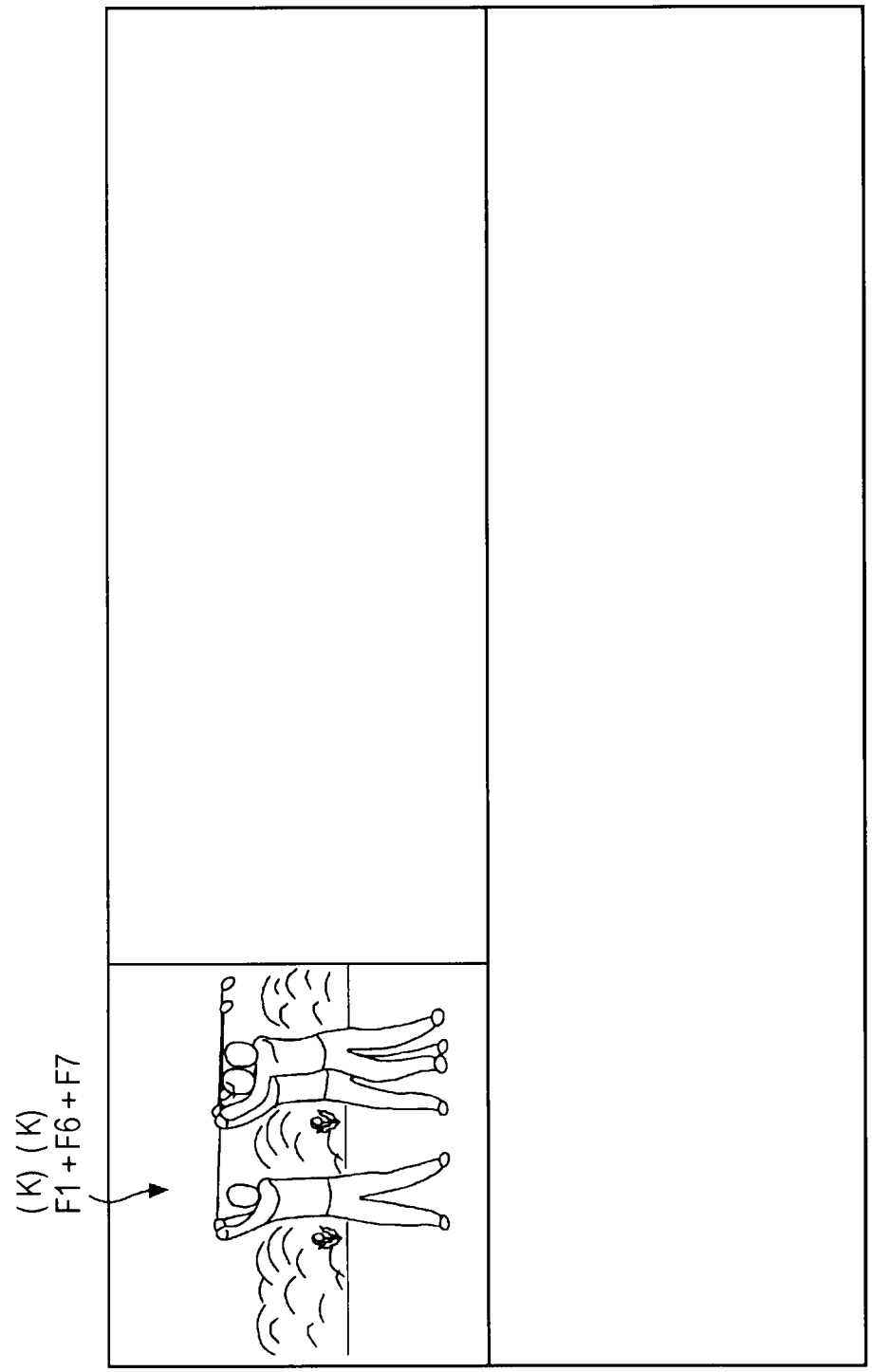
FIG. 15 illustrates a motion sequence moving image according to the embodiment.

FIG. 15 illustrates a combined image data item of when a non-key frame F7 is input. As in the above-described case, in this case, the image of the non-key frame F7 is combined with the existing combined image data item so that a combined image of the images in the key frames F1 and F6 and the image in the non-key frame F7 is generated.

Figure 16:
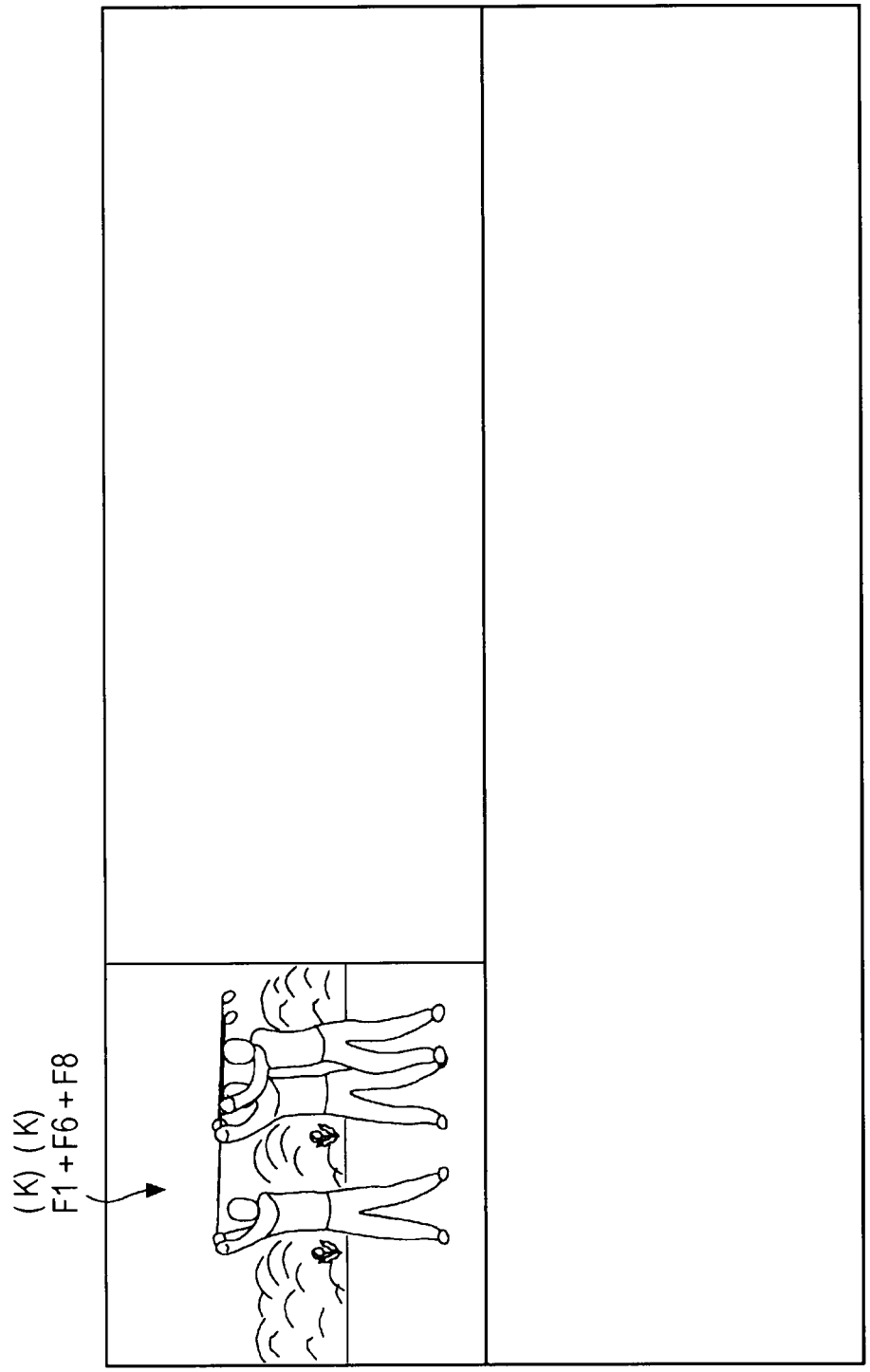
FIG. 16 illustrates a motion sequence moving image according to the embodiment.

FIG. 16 illustrates a combined image data item of when a non-key frame F8 is further input. As in the above-described case, in this case, the image of the non-key frame F8 is combined with the existing combined image data item so that a combined image of the images in the key frames F1 and F6 and the image in the non-key frame F8 is generated.

Subsequently, when non-key frames F9 and F10 are input, a similar operation is performed.

Figure 17:
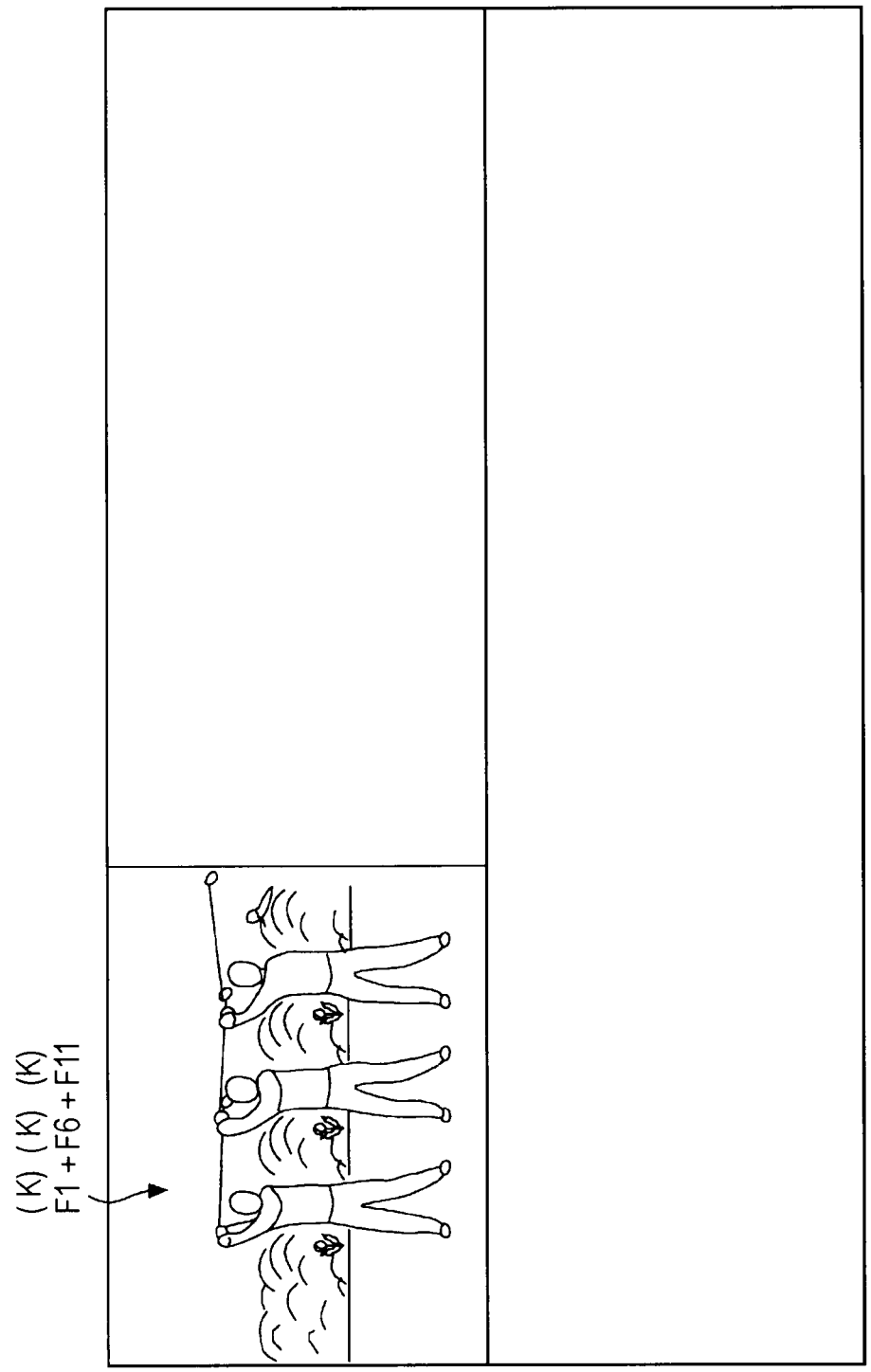
FIG. 17 illustrates a motion sequence moving image according to the embodiment.

FIG. 17 illustrates a combined image data item of when a third key frame F11 is input. At that time, the key frame F6 is combined with the existing combined image data item.

However, at that time, the combined image data item shown in FIG. 17 is also stored as the existing combined image data item. In addition, at that time, the previous combined image data item is updated to the combined image item shown in FIG. 17 as the existing combined image data item, and the combined image data item immediately preceding the previous combined image data item is updated to the combined image shown in FIG. 14 as the existing combined image data item. These update combined images are stored.

Figure 18:
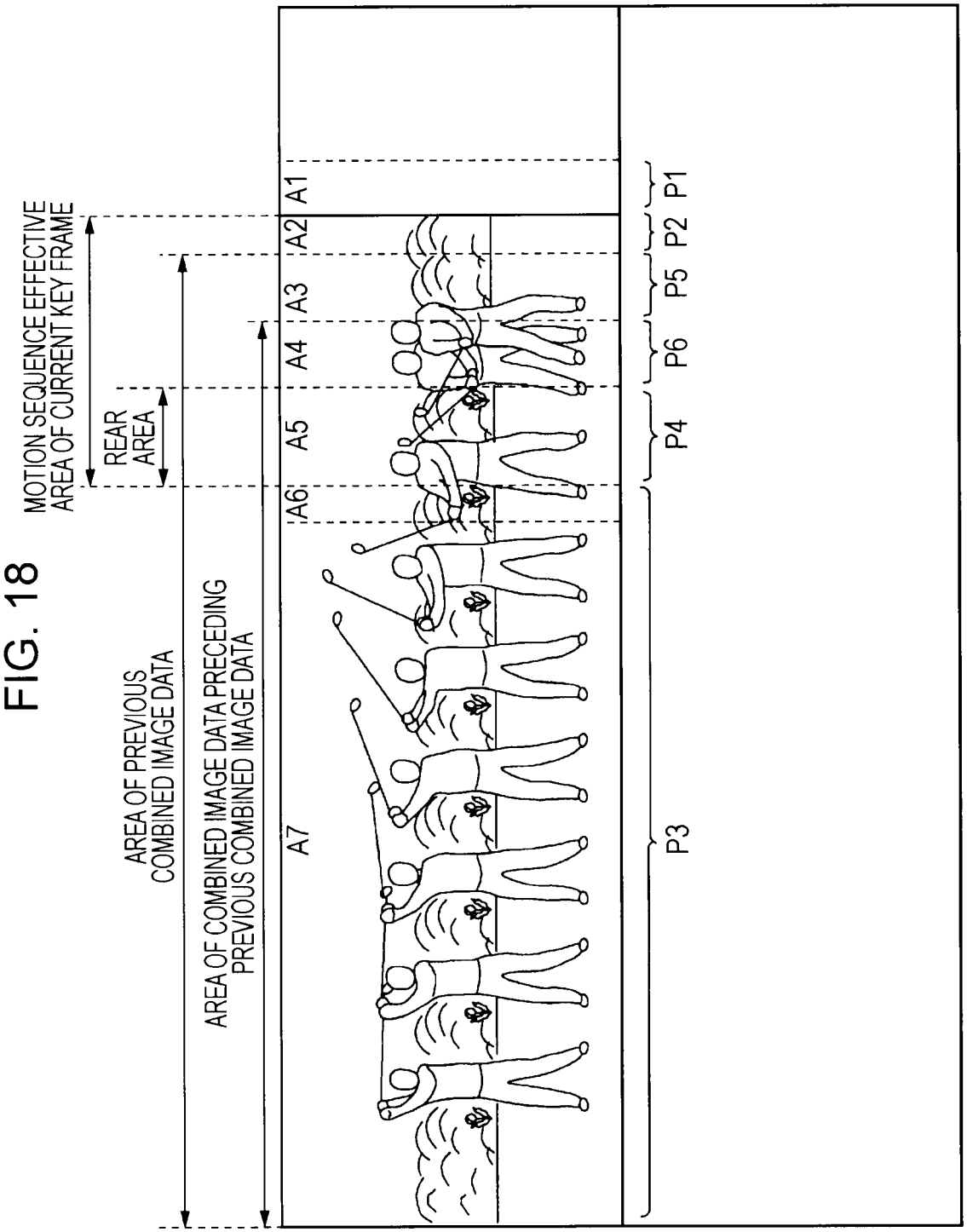
FIG. 18 illustrates a motion sequence moving image and a combining process in a second example of generation processing according to the embodiment.
Figure 19:
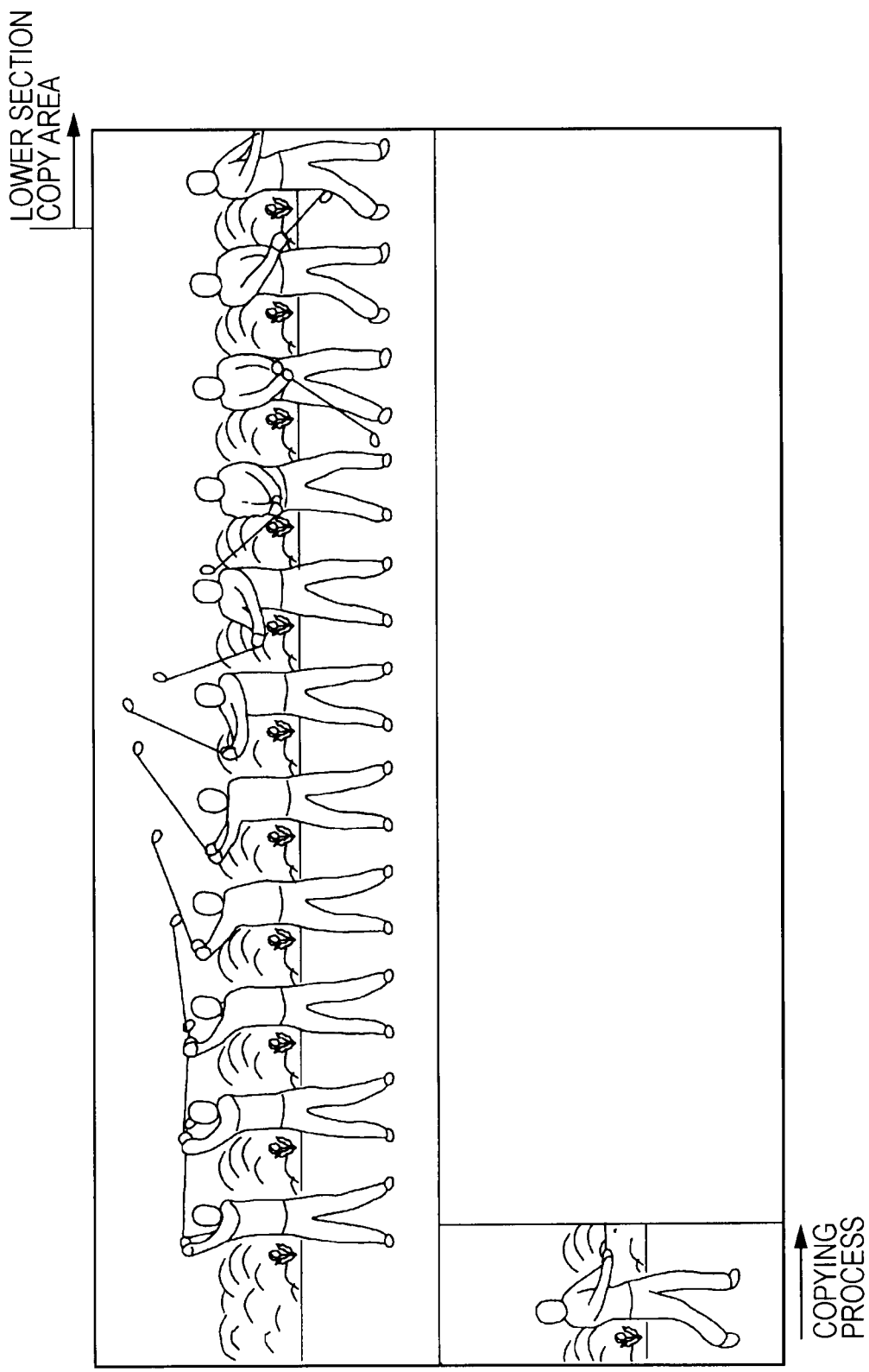
FIG. 19 illustrates a motion sequence moving image and a lower section copy process according to the embodiment.
Figure 20:
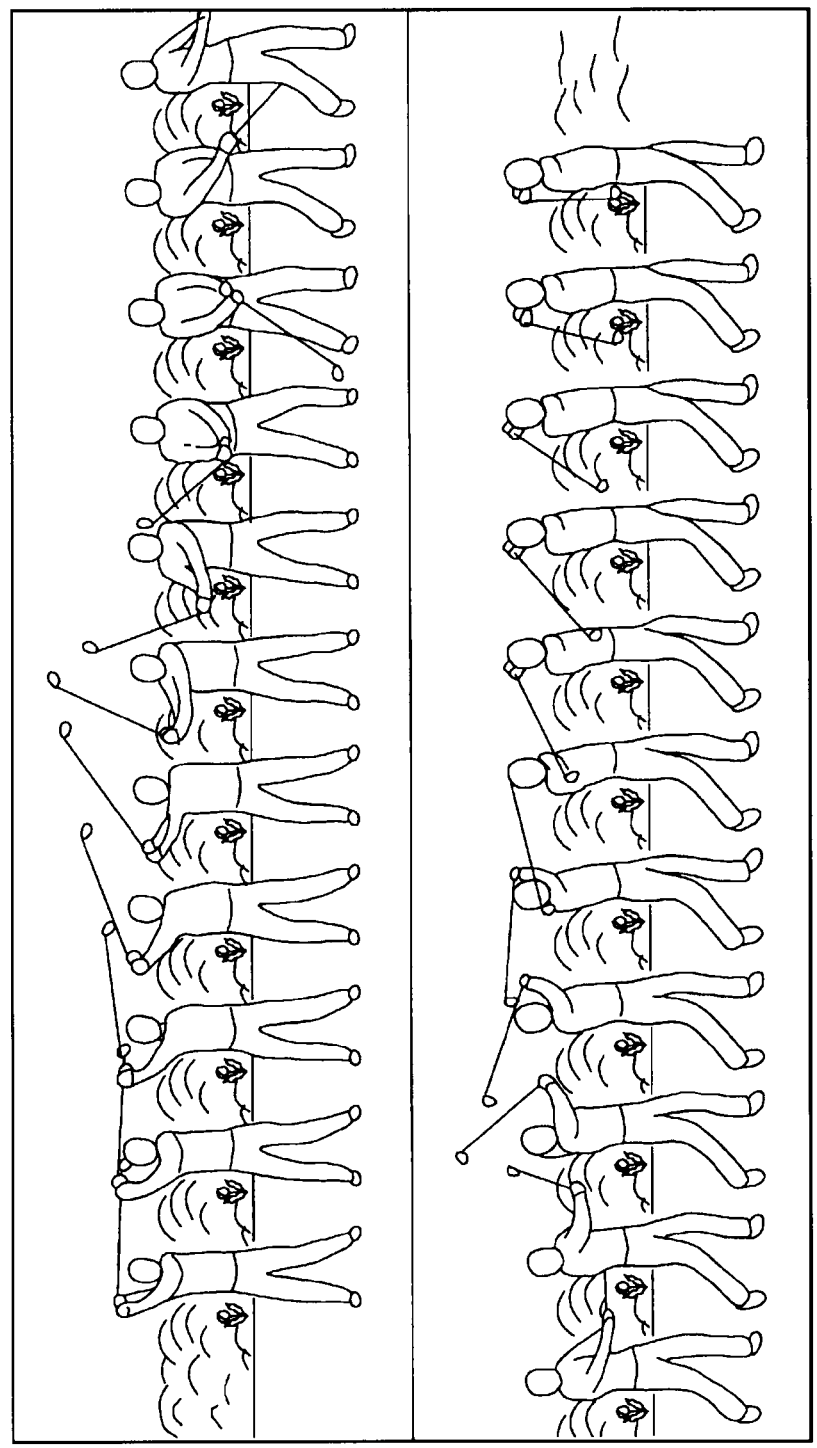
FIG. 20 illustrates a motion sequence moving image and a final frame according to the embodiment.

As shown in FIGS. 11 to 17, the combining process is performed each time the frame data (the key frames and non-key frames) are sequentially input. As a result, at each time, the combined image data item shown in one of FIGS. 11 to 17 is obtained. For example, each of the combined image data items is output in the form of a frame of a moving image. In addition, subsequently, each time a frame image data item is input, a combined image data item is generated in a similar manner. In this way, the moving image is output, as illustrated in FIGS. 18 to 20.

That is, the subject image in each frame (a key frame or a non-key frame) is sequentially combined so that the subject images in the previous frames still remain. Each time the combined image data item of the frame is generated, the combined image data item is output.

In this way, a moving image that represents the motion sequence, such as that of a golf swing, that is, a motion sequence moving image, is output.

A particular second example of generation of a motion sequence image on the basis of the above-described processes is described next with reference to FIGS. 21 to 27.

Figure 21:
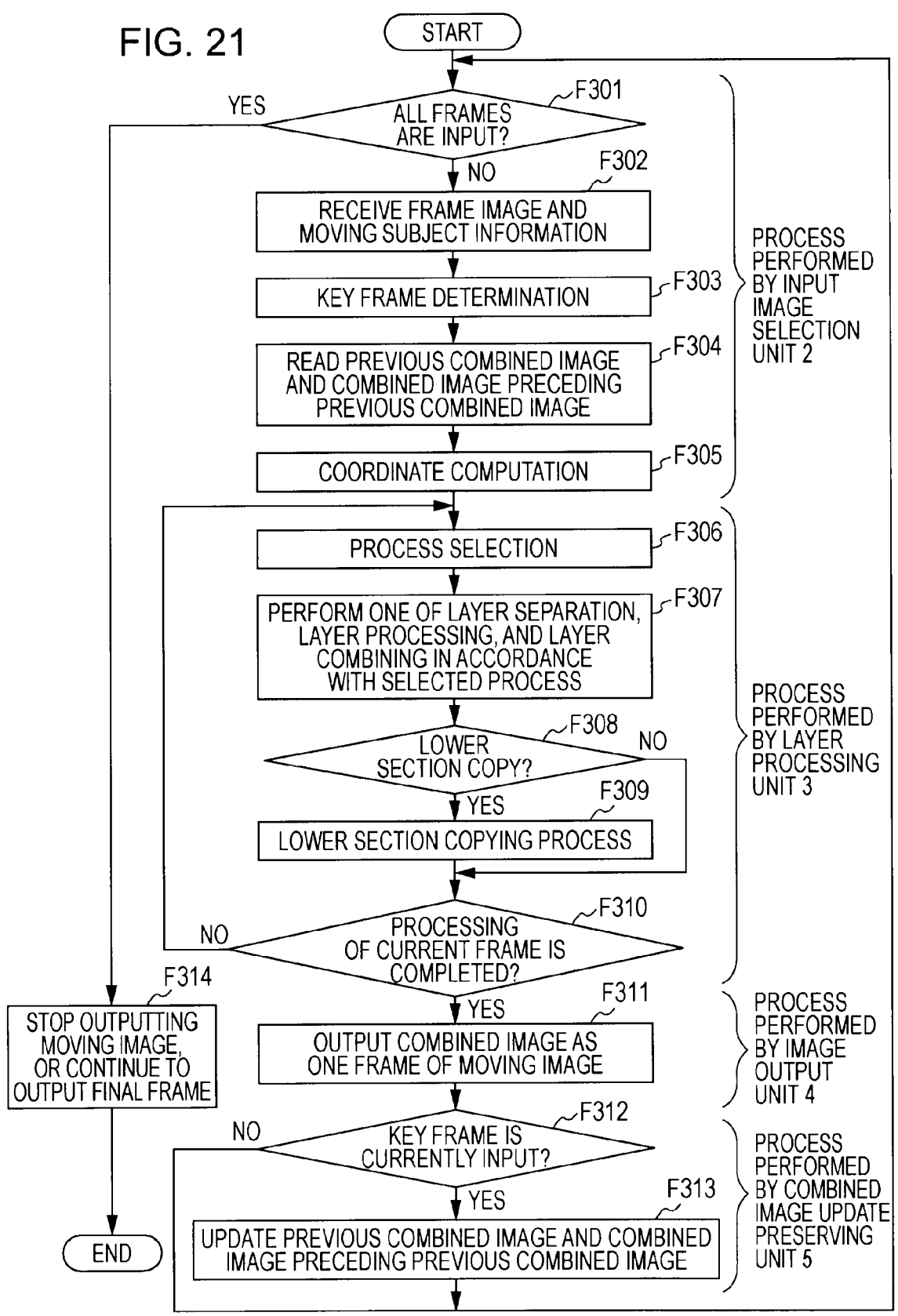
FIG. 21 is a flowchart of the second example of generation processing according to the embodiment.

FIG. 21 is a flowchart of exemplary processing performed by the input image selection unit 2, the layer processing unit 3, the image output unit 4, and the combined image update preserving unit 5 in order to generate a motion sequence moving image.

Processing in steps F301 to F305 is performed by the input image selection unit 2.

As mentioned earlier, the input image selection unit 2 receives time-series frame image data items from the image input unit 10. Each time the input image selection unit 2 receives one of the frame image data items, the input image selection unit 2, in step F302, further retrieves the moving subject information corresponding to the received frame image data item from the moving subject information generation unit 11 (or the moving subject information input unit 12).

Note that, in step F301, it is determined whether all of a series of frame image data items that forms the motion sequence still image has been received, that is, it is determined whether supply of the frame image data items from the image input unit 10 is completed. That is, the processing proceeds from step F301 to step F302 until a predetermined number of key frames used for generating the motion sequence still image have been input.

After the input image selection unit 2 receives the frame image data item and the subject image information corresponding to the frame image data item in step F302, the input image selection unit 2, in step F303, determines whether the frame image data item is to be selected as a key frame. For example, when key frames are selected as illustrated in FIG. 3, every fifth frame (a first frame, a sixth frame, an eleventh frame . . . ) is selected as a key frame.

After determination whether the input frame image data item is to be selected as a key frame is made, the processing proceeds to step F304, where the input image selection unit 2 retrieves the existing previous combined image data item and the combined image data item preceding the existing previous combined image data item from the combined image update preserving unit 5.

Note that before a combining process is performed on frame image data item that forms a first key frame, the previous combined image data item and the combined image data item preceding the previous combined image data item are not present. In addition, before a combining process is performed on a frame image data item that forms a second key frame, the combined image data item preceding the previous combined image data item is not found. Accordingly, in step F304, if the previous combined image data item and the combined image data item preceding the existing previous combined image data item are stored in the combined image update preserving unit 5 at that time, the input image selection unit 2 retrieves the previous combined image data item and the combined image data item preceding the previous combined image data item.

In step F305, the input image selection unit 2 performs coordinate computation. In the coordinate computation, the positions of pixels of the current frame image data item (a key frame or a non-key frame) used when the current frame image data item is combined with the combined image are computed. That is, a pixel range within the size of a final combined image (the screen size of the motion sequence moving image) into which the current frame image data has been combined is computed.

The input image selection unit 2 outputs the coordinates computed in step F305 to the layer processing unit 3 together with the current frame image data item, the moving subject information regarding the current frame image data item, the existing previous combined image data item, and the combined image data item preceding the existing previous combined image data item.

In step F306, the layer processing unit 3 performs a process determination.

In process determination, which combining process is to be performed on each pixel, each pixel column, or each pixel row in the pixel range subjected to a combining process is determined in order to perform an efficient combining process.

Note that when, as shown in FIGS. 11 to 20, a motion sequence moving image in which the time-series subject images are arranged in the horizontal direction is generated, process determination can be made for each of the pixels or each of the pixel columns. In contrast, although not shown, when a motion sequence moving image in which the time-series subject images are arranged in the vertical direction is generated, process determination can be made for each of the pixels or each of the pixel rows. The following descriptions are made on the basis of process determination made for each of the pixel columns so as to correspond to the example illustrated in FIGS. 11 to 20.

Figure 22:
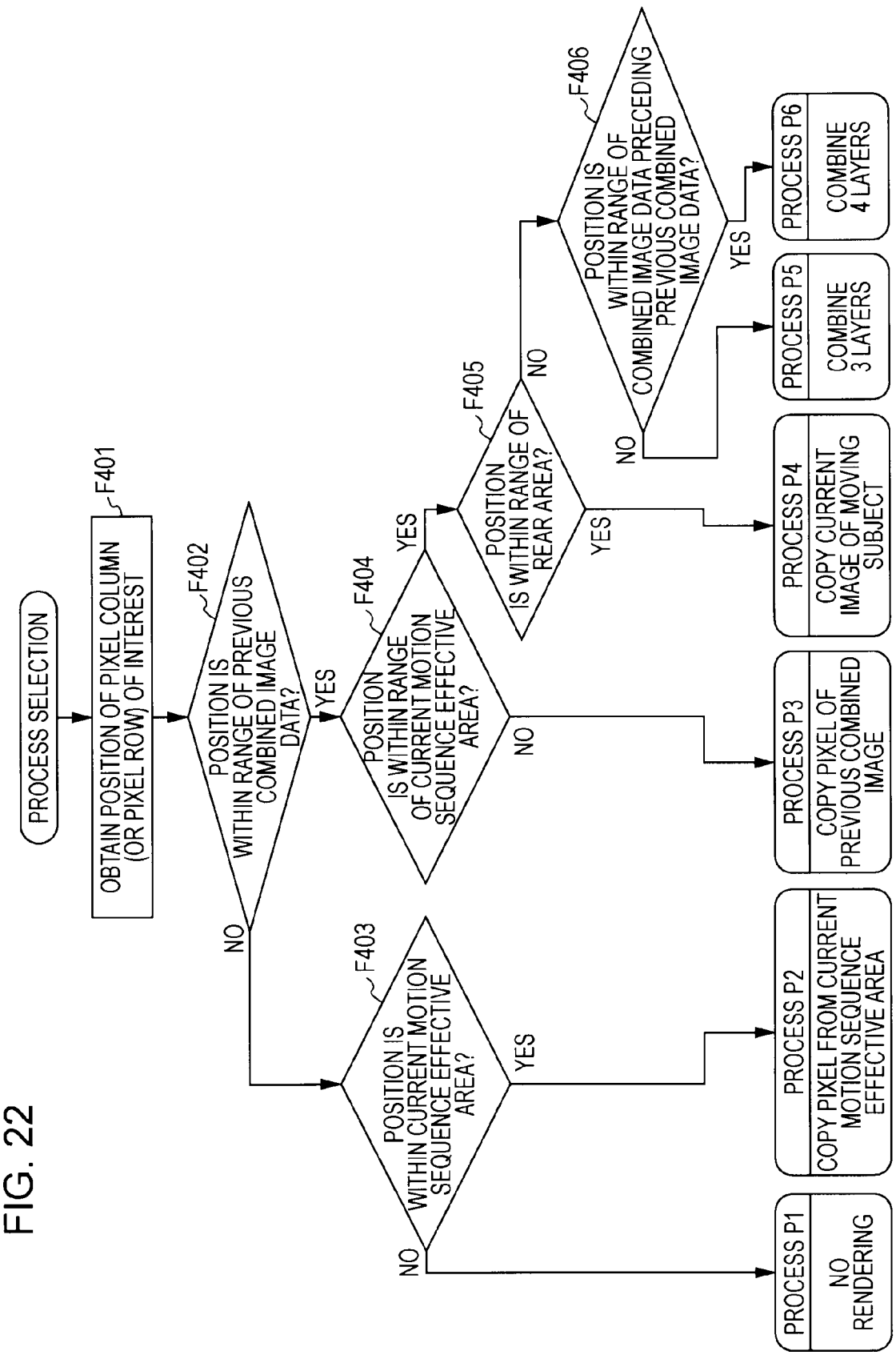
FIG. 22 is a flowchart illustrating process determination performed in the second example of generation processing according to the embodiment.

FIG. 22 is a flowchart illustrating process selection performed in step F306.

In this example, the current frame image data item, the previous combined image data item, and the combined image data item preceding the previous combined image data item are used in the combining process. When two existing combined image data items are used, the number of processes from which one is to be selected is six (processes P1 to P6). If the number of the used combined image data items increases (e.g., if the second combined image data item before last is also used), the number of processes increases.

In addition, in the combining process, information regarding the range of the previous key frame and the moving subject information included in the previous combined image data item and information regarding the range of the key frame preceding the previous key frame and the moving subject information included in the combined image data item preceding the previous combined image data item are used. These information items can be stored in the combined image update preserving unit 5 together with the previous combined image data item and the combined image data item preceding the previous combined image data item and can be read in step F302.

The process selection illustrated in FIG. 22 is made for each of the pixel columns (a pixel column of interest). For example, in FIG. 18, pixel columns subjected to the process selection are pixel columns in areas A1 to A7. Each of the pixel columns in these areas (a pixel column in the upper section of the combined image data item in FIG. 18) is selected as a pixel column of interest, and the process selection is made for the pixel column of interest.

In step F401, the layer processing unit 3 selects one of the pixel columns as a pixel column of interest and acquires the pixel position of the pixel column (the coordinates of the pixel in the combined image data item).

In step F402, it is determined whether the position of the pixel column of interest is within the range of the previous combined image data item. In this example, the range of the previous combined image data item is the range of the areas A3 to A7 shown in FIG. 18.

If the pixel column of interest is not within the range of the previous combined image data item, the processing proceeds to step F403, where the layer processing unit 3 determines whether the pixel column of interest is within the current motion sequence effective area. The current motion sequence effective area is the motion sequence effective area of the currently input frame image data (a key frame or a non-key frame) (see FIG. 6B), that is, the range of the areas A2 to A5 illustrated in FIG. 18.

If, in step F403, the layer processing unit 3 determines that the pixel column of interest is not within the current motion sequence effective area, the layer processing unit 3 determines that the process P1 is applied to the pixel column of interest. That is, it is determined that the process P1 is applied to the pixel column of interest if the pixel column of interest is located within the area A1 illustrated in FIG. 18.

However, if, in step F403, the layer processing unit 3 determines that the pixel column of interest is within the current motion sequence effective area, the layer processing unit 3 determines that the process P2 is applied to the pixel column of interest. That is, it is determined that the process P2 is applied to the pixel column of interest if the pixel column of interest is located within the area A2 illustrated in FIG. 18.

However, if, in step F402, it is determined that the position of the pixel column of interest is within the range of the previous combined image data item, the processing proceeds to step F404, where the layer processing unit 3 determines whether the pixel column of interest is within the current motion sequence effective area. If, in step F404, the layer processing unit 3 determines that the pixel column of interest is not within the current motion sequence effective area, the layer processing unit 3 determines that the process P3 is applied to the pixel column of interest. That is, it is determined that the process P3 is applied to the pixel column of interest if the pixel column of interest is located within the range defined by the areas A6 and A7 illustrated in FIG. 18.

However, if, in step F404, the layer processing unit 3 determines that the pixel column of interest is within the current motion sequence effective area, the processing proceeds to step F405, where the layer processing unit 3 determines whether the pixel column of interest is located within the range of a rear area. As used herein, the term "rear area" refers to a rear area in the motion sequence effective area in a motion sequence direction A (in the case in which the motion sequence is represented from the left to the right), as shown in FIG. 6B. In addition, the rear area is not included in the remaining background area shown in FIG. 6C. Note that, in the case in which the motion sequence is represented from the right to the left, the rear area is the left portion of the motion sequence effective area. Furthermore, in the case in which the motion sequence is downwardly represented, the rear area is the upper portion of the motion sequence effective area.

In the example illustrated in FIG. 18, the pixel column in the area A5 is determined that it is within the rear area.

If, in step F405, the layer processing unit 3 determines that the pixel column of interest is located within the rear area, the layer processing unit 3 determines that the process P4 is applied to the pixel column of interest. That is, it is determined that the process P4 is applied to the pixel column of interest if the pixel column of interest is located within the area A5 illustrated in FIG. 18.

However, if, in step F405, the layer processing unit 3 determines that the pixel column of interest is not located within the rear area, the processing proceeds to step F406, where the layer processing unit 3 determines whether the pixel column of interest is within the range of the combined image data item preceding the previous combined image data item. In FIG. 18, the range of the combined image data item preceding the previous combined image data item is a range defined by the areas A4 to A7 illustrated in FIG. 18.

If the layer processing unit 3 determines that the pixel column of interest is not within the range of the combined image data item preceding the previous combined image data item, the layer processing unit 3 determines that the process P5 is applied to the pixel column of interest. That is, it is determined that the process P5 is applied to the pixel column of interest if the pixel column of interest is located within the range defined by the area A3 illustrated in FIG. 18.

However, if, in step F406, the layer processing unit 3 determines that the pixel column of interest is within the range of the combined image data item preceding the previous combined image data item, the layer processing unit 3 determines that the process P6 is applied to the pixel column of interest. That is, it is determined that the process P6 is applied to the pixel column of interest if the pixel column of interest is located within the range defined by the area A6 illustrated in FIG. 18.

Each time the layer processing unit 3 performs the above-described process determination as shown in FIG. 22 for a pixel column of interest in step F306 shown in FIG. 21, the layer processing unit 3 also performs the combining process in step F307. In step F307, the pixels in the pixel column of interest are combined so as to generate a combined image. In addition, a layer separation process, a layer processing process, or a layer combining process is performed if necessary.

Thereafter, steps F306 to F309 are repeated until it is determined in step F310 that the processing for the currently input frame image data is completed (steps F308 and F309 are described below). That is, when process determination is performed for each of the pixel columns, the process determination and the combining process are repeated until all of the pixel columns are processed.

A combining process performed on a pixel of interest in accordance with the process determination is described next.

Figure 23A:
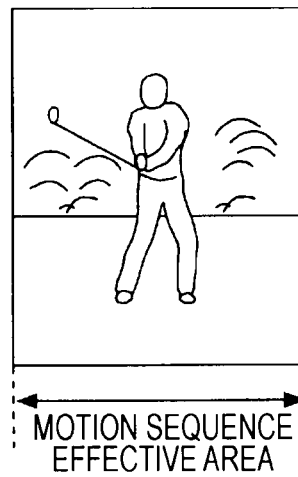
FIGS. 23A to 23C illustrate image data used in the combining process in the second example of generation processing according to the embodiment.
Figure 23B:
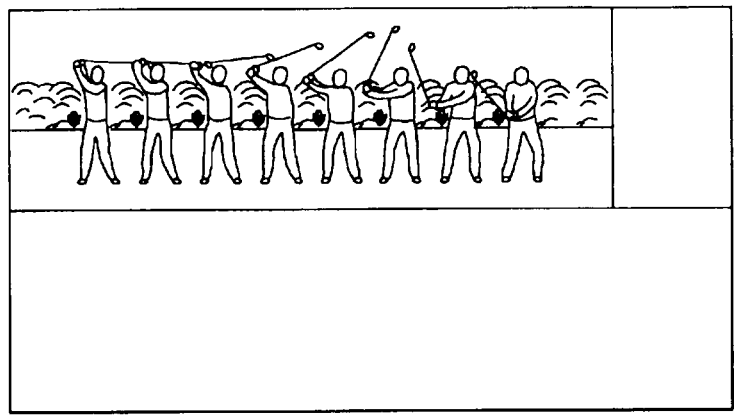
Figure 23C:
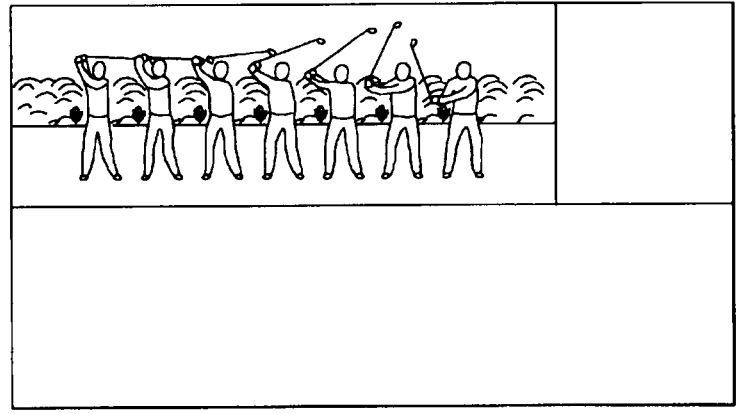

FIGS. 23A to 23C illustrate image data used in the combining process.

FIG. 23A illustrates a motion sequence effective area of the current input image (frame image data) input in step F302.

FIG. 23B illustrates the previous combined image data item at that time.

FIG. 23C illustrates a combined image data item preceding the previous combined image data item at that time.

Note that the input image, the previous combined image data item, and the combined image data item preceding the previous combined image data item shown in FIG. 18 are used as these data items.

In the process P1, rendering is not performed. Accordingly, when the process P1 is applied to a pixel of interest, the pixels are not combined with the combined image in step F307.

Since the process P1 is applied to the pixel columns in the area A1 shown in FIG. 18, nothing is rendered in the area A1.

In the process P2, pixel data in the motion sequence effective area of the current frame image data are copied.

Since the process P2 is applied to the pixel columns in the area A2 shown in FIG. 18, the area A2 serves as an area that does not overlap with the previous combined image data item (and the combined image data item preceding the previous combined image data item). Accordingly, the pixels in the current input image can be directly used.

Figure 24A:
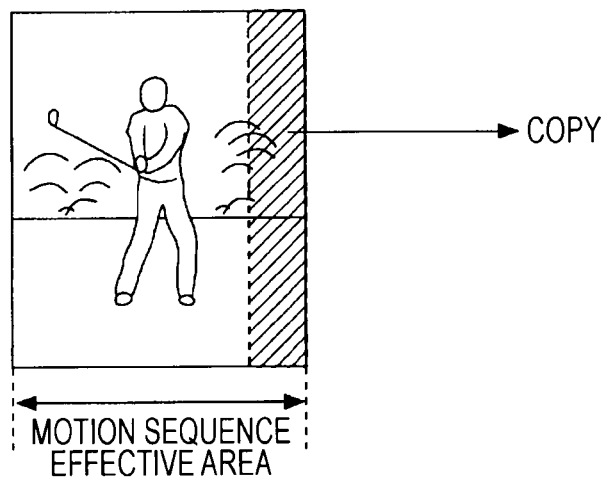
FIGS. 24A and 24B illustrate processes P2 and P3 selected in the second example of generation processing according to the embodiment.

As shown in FIG. 24A, the pixels in the area A2 are pixels of the pixel columns in the hatching portion of the motion sequence effective area of the input image.

The pixels of the pixel columns are directly applied to the area A2 shown in FIG. 18.

In the process P3, pixel data are copied from the previous combined image data item.

The pixel columns to which the process P3 is applied are the pixel columns of the areas A6 and A7 shown in FIG. 18. The areas A6 and A7 do not overlap with the motion sequence effective area of the current input frame image data. Accordingly, the pixels of the previous combined image data item can be directly used.

Figure 24B:
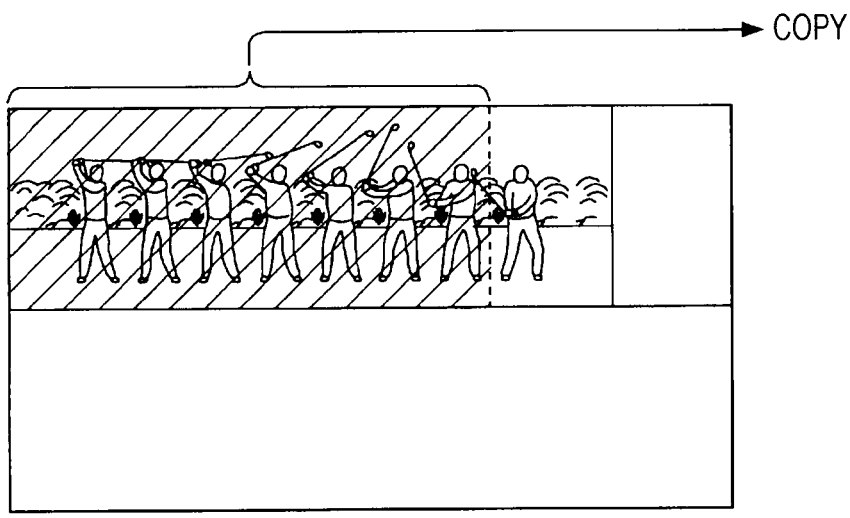

As shown in FIG. 24B, the pixels in the areas A6 and A7 are pixels of the pixel columns in the hatching portion of the previous combined image data item.

The pixels of the pixel columns of the combined image data item are directly copied to the pixels in the areas A6 and A7 shown in FIG. 18.

In the process P4, pixel data of the moving subject image (the moving subject layer) of the current frame image data are copied onto the previous combined image data item.

The pixel columns to which the process P4 is applied are the pixel columns of the area A5 shown in FIG. 18. The area A5 is a rear area of the currently input frame image data. In this area, only the moving subject in the current frame image data overlaps with the previous combined image data item and is displayed.

Figure 25:
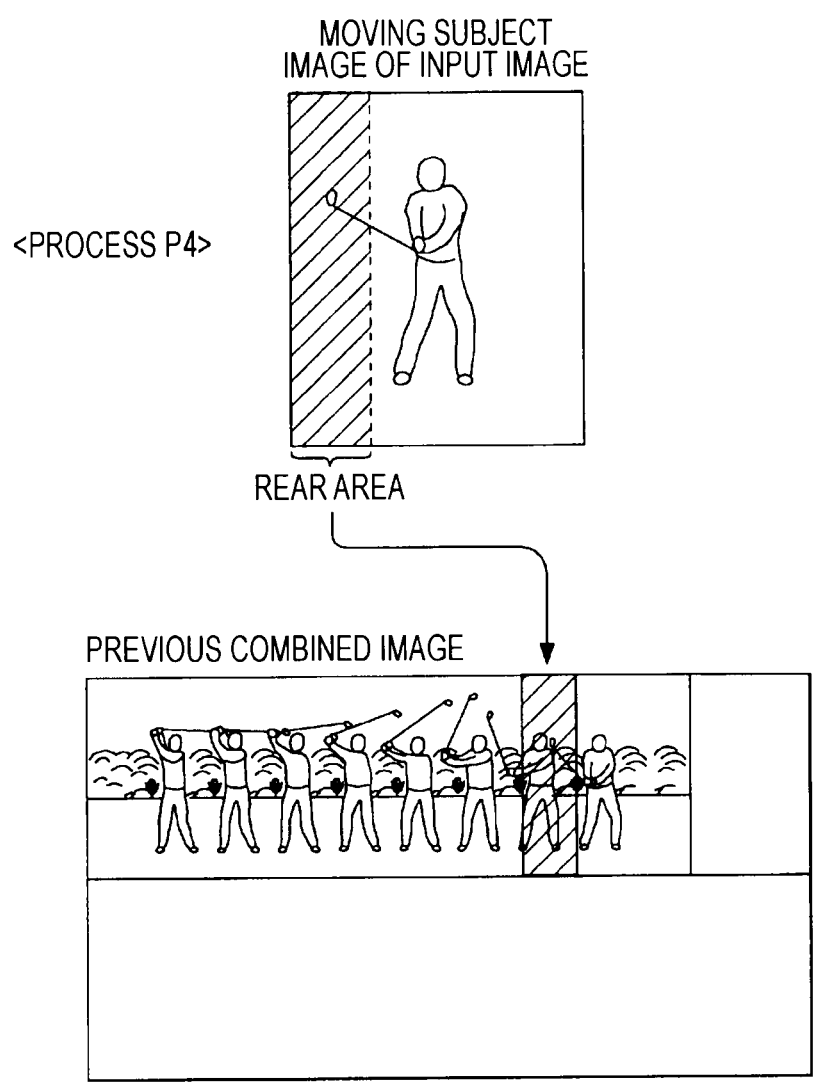
FIG. 25 illustrates a process P4 selected in the second example of generation processing according to the embodiment.

The moving subject image in the input image is shown in the upper section of FIG. 25. This section serves as a moving subject layer obtained by separating the input frame image data into layers as illustrated in FIG. 4. That is, using the layer separating sub-unit 31, the layer processing unit 3 separates the currently input frame image data into layers and generates an image including only the image of the moving subject (without its background image), as illustrated in FIG. 4.

In FIG. 25, the hatching portion of the moving subject image corresponds to a rear area. Among the pixels of the pixel columns of the rear area, only pixels that form the moving subject image are copied to a portion corresponding to the area A5 of the previous combined image data item (the hatching portion).

In this way, the copied pixels of the moving subject image in the rear area of the current frame image data are used as the combined image data item in the area A5 shown in FIG. 18.

In the process P5, the following three layers are combined: the moving subject image of the currently input frame image data, the moving subject image in the previous key frame, and the background image of the currently input frame image data.

For example, the process P5 is applied to each of the pixel columns of the area A3 shown in FIG. 18. The area A3 is an area in which the motion sequence effective area of the currently input frame image data overlaps with the previous combined image data item. Accordingly, the three layers are combined in accordance with the priorities shown in FIGS. 26A to 26C.

Figure 26A:
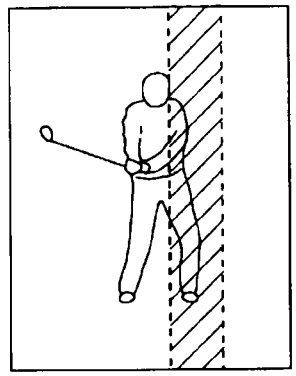
FIGS. 26A to 26C illustrate a process P5 selected in the second example of generation processing according to the embodiment.

FIG. 26A illustrates the moving subject image (the moving subject layer) of the input image. FIG. 26C illustrates the background image (the remaining background layer) of the input image.

Like the process P4, using the layer separating sub-unit 31, the layer processing unit 3 separates the input frame image data into layers, as illustrated in FIG. 4, so as to obtain the moving subject image and the background image.

Figure 26B:
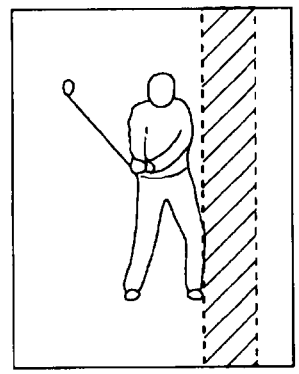
Figure 26C:
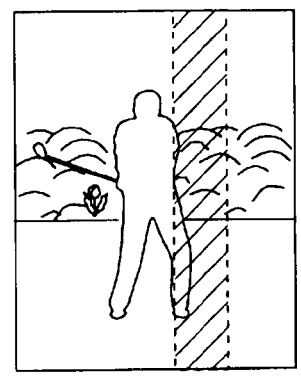

FIG. 26B illustrates the moving subject image (the moving subject layer) of the key frame of when the previous combined image data item is generated (i.e., the previous key frame). Note that the previous key frame image is included in the previous combined image data item. However, the moving subject image of the previous key frame can be extracted using the moving subject information regarding the previous key frame.

In FIGS. 26A, 26B, and 26C, the portion corresponding to the area A3 of the combined image shown in FIG. 18 is indicated by hatchings.

In the combining process performed in the process P5, the pixels in pixel columns of the hatching portions in FIGS. 26A, 26B, and 26C are layer-combined while assigning the top priority to the moving subject image in the input image, a second priority to the moving subject image in the previous key frame, and a third priority to the background image in the input image.

That is, top priority is given to the pixels that form the moving subject in the hatching portion of FIG. 26A. If pixels that form the moving subject are found in the hatching portion of FIG. 26B, such pixels are placed in the portion of the pixels other than the pixels that form the moving subject in the hatching portion of FIG. 26A. The pixels that form the background image shown in FIG. 26C are placed in other pixel portion of FIG. 26A.

Such pixels in the three layers are used as the combined image data item of the area A3 shown in FIG. 18.

In the process P6, the following four layers are combined: the moving subject image of the currently input frame image data, the moving subject image in the previous key frame, the moving subject image in the combined image data item preceding the previous combined image data item, and the background image of the currently input frame image data.

The pixel columns to which the process P6 is applied are the pixel columns of the area A4 shown in FIG. 18. The area A4 is an area in which the motion sequence effective area of the currently input frame image data overlaps with the previous combined image data item and the combined image data item preceding the previous combined image data item. Accordingly, the four layers are combined in accordance with the priorities shown in FIGS. 27A to 27D.

FIG. 27A illustrates the moving subject image (the moving subject layer) of the input image. FIG. 27D illustrates the background image (the remaining background layer) of the input image.

FIG. 27B illustrates the moving subject image (the moving subject layer) of the key frame of when the previous combined image data item is generated (i.e., the previous key frame).

FIG. 27C illustrates the moving subject image (the moving subject layer) of the key frame of when the combined image data item preceding the previous combined image data item is generated (i.e., the previous key frame).

Like the process P4, using the layer separating sub-unit 31, the layer processing unit 3 separates the input frame image data into layers, as illustrated in FIG. 4, so as to obtain the moving subject image and the background image. In addition, the layer processing unit 3 extracts the moving subject image in the previous key frame from the previous combined image data item using the moving subject information. Furthermore, the layer processing unit 3 extracts the moving subject image in the key frame preceding the previous key frame from the combined image data item preceding the previous combined image data item using the moving subject information.

In FIGS. 27A, 27B, 27C, and 27D, areas corresponding to the area A4 of the combined image shown in FIG. 18 are indicated by hatchings.

As shown in FIGS. 27A, 27B, 27C, and 27D, in the combining process of the process P6, the pixels in the columns indicated by the hatchings shown in FIGS. 27A, 27B, 27C, and 27D are layer-combined by giving top priority to the moving subject image in the input image, a second priority to the moving subject image in the previous key frame, a third priority to the key frame preceding the previous key frame, and a fourth priority to the background image in the input image.

That is, top priority is given to the pixels that form a moving subject image in the area with hatchings in FIG. 27A. If the pixels that form the moving subject image in the area with hatchings in FIG. 27B are found, such pixels are used for the pixels other than the pixels that form the moving subject image in the area with hatchings in FIG. 27A. In addition, the areas of FIGS. 27A and 27B in which the pixels that form the moving subject image are not found and the pixels that form the moving subject image are found in FIG. 27C, such pixels are used. The pixels that form the background image in FIG. 27D are used for the other pixel areas.

Such pixels in the four layers are used as the combined image data item of the area A4 shown in FIG. 18.

In the processes P1 to P6, the combining process is performed as described below.

In step F307 shown in FIG. 21, one of the above-described P1 to P6 is performed on the pixel of interest in accordance with the process selection result of step F306.

Note that the processes from step F306 to step F309 may be repeated on a pixel-by-pixel basis instead of a column-by-column basis.

When one of the processes P1 to P6 is performed on all of the columns (all of the pixels), combined image data item (e.g. the combined image data item shown in FIG. 18) is generated.

At that time, the processing proceeds from step F310 to F311.

In step F311, the layer processing unit 3 supplies the combined image data item to the image output unit 4. The image output unit 4 outputs the supplied combined image to the output device 40 in the form of a frame that forms a motion sequence moving image.

Note that, in accordance with the time necessary for the combining process, the input interval of frame image data items from the image input unit 10 or in order to generate a moving image in which a motion sequence is slowly represented, the image output unit 4 may continuously output one combined image data item in the form of a plurality of frames that form a motion sequence moving image.

In step F312, the processing is branched in accordance with whether the currently processed frame image data serves as a key frame or not. That is, the processing is branched in accordance with the determination result of step F303.

If the currently input frame image data serves as a key frame, the currently generated combined image data item is stored in the combined image update preserving unit 5 in step F313 in order to use the stored combined image data item as the previous combined image data item in the subsequent processes.

The combined image update preserving unit 5 changes the currently stored previous combined image data item to the combined image data item preceding the previous combined image data item. In addition, the combined image update preserving unit 5 stores the combined image data item currently supplied from the image output unit 4 as the previous combined image data item. Note that the moving subject information of the key frame is stored at the same time.

Subsequently, the processing returns to step F301, from which the processing of the next frame image data item is started.

When the processing from step F301 to step F313 is performed each time frame image data is input, the motion sequence moving image as shown in FIGS. 11 to 20 is generated.

That is, each time frame image data is input and the image combining process is performed, combined image data item is output in step F311 as a frame that forms the moving image. In this way, if the output device 40 serves as a monitor display apparatus, a motion sequence moving image is displayed on the output device 40.

Alternatively, if the output device 40 serves as an image recording apparatus, each of the frames that form a motion sequence moving image is recorded in the output device 40 in the form of moving image data.

If, in step F301, it is determined that all of the frames are input, the processing proceeds to step F314, where the combining process is completed. In addition, the image output unit 4 stops outputting combined image data item. Alternatively, if the output device 40 serves as a monitor display apparatus, the output device 40 continuously outputs the combined image data item of the final frame (e.g., that shown in FIG. 20). In such a case, after the motion sequence moving image shown in FIGS. 11 to 20 is displayed on the monitor display apparatus, the final image shown in FIG. 20 is continuously displayed.

As described above, according to the present embodiment, a motion sequence moving image can be generated and output. Since a combined image data item of each time is output in the form of a moving image, this motion sequence moving image can have a high visual effect, and a user can easily recognize the motion sequence.

In particular, in the second example of generation processing, a combining process is performed on the basis of the above-described process selection. Accordingly, an efficient process is realized. That is, the processing load of the combining processes P5 and P6 in which the third and fourth layers are combined is relatively heavy. However, the processes are performed only for necessary pixel areas. For the pixel areas for which the layer combining process is not necessary, a simplified copy process, such as the process P1, P2, or P3, is sufficient. Thus, the efficiency of the processing can be increased, and the processing load can be reduced.

Note that, like the motion sequence still image in the first example of generation processing, in the second example of generation processing, the moving subject can be accurately represented by expanding the motion sequence effective area of the subject. In addition, the motion sequence can be finely represented in the time direction by arranging a plurality of subject images. For example, the top portion of a golf club can be precisely shown without missing the image of the top portion of a golf club. In addition, since a plurality of moving subject images can be arranged, the motion sequence can be represented at short time intervals.

Furthermore, like the first example of generation processing, the image processing apparatus 1 that generates and outputs such a motion sequence moving image can be applied to a wide variety of apparatuses.

The processing performed in steps F308 and F309 shown in FIG. 21 is described next.

In the copying process performed in step F309, as shown in FIG. 19, for example, the image of the last moving object in the upper section is copied as a first moving object in the lower section.

As shown in FIG. 19, a predetermined area of the combined image data item at the right end of the upper section (in the case in which the subject image moves from the left to right) is defined as a lower section copy area.

In step F308, the layer processing unit 3 performs process selection and determines whether each of the pixel column (or the pixels) of the combined image data item corresponds to the lower section copy area (i.e., the area of the upper section at the right end). If the pixel column (or the pixels) corresponds to the lower section copy area, the layer processing unit 3 copies each of the pixels in the column to the corresponding position in the lower section in step F309.

By performing such processing, when, as shown in FIG. 19, an image in the lower section copy area of the upper section is generated, the same image is simultaneously combined in the lower section.

When the motion sequence moving image is displayed, for the moving subject image in the area of the subject at the right of the upper section of FIG. 19 and the moving subject image in the area of the subject at the left of the lower section of FIG. 19, the same images appear at the same time.

By performing such processing, even the moving object image in the lower section copy area can be precisely represented without losing part of the image. That is, even when the subject image at the right of the upper section is not displayed, the subject image can be precisely displayed in the lower section. In addition, the user can easily view a change from the motion sequence in the upper section to the motion sequence in the lower section.

4. Moving Subject Information

As described above, in the layer separation processes of the first and second examples of generation processing, frame image data is separated into a moving subject layer and a remaining background layer. When the layer separation process is performed, the moving subject information received from the moving subject information generation unit 11 or the moving subject information input unit 12 is used.

In each of the above-described examples, as shown in FIG. 4A, the moving subject information is represented using a binary value. However, a multi-level value representing three values or more can be used for the moving subject information.

For example, the moving subject information generation unit 11 or the moving subject information input unit 12 may generate (or acquires) the moving subject information representing a different value in accordance with the depths of the plurality of moving subjects (a foreground/background relationship in the image).

In such a case, the layer separating sub-unit 31 can separate the image into the layers equal in number to a sum of the number of the moving subject and the number of the backgrounds.

Figure 28A:
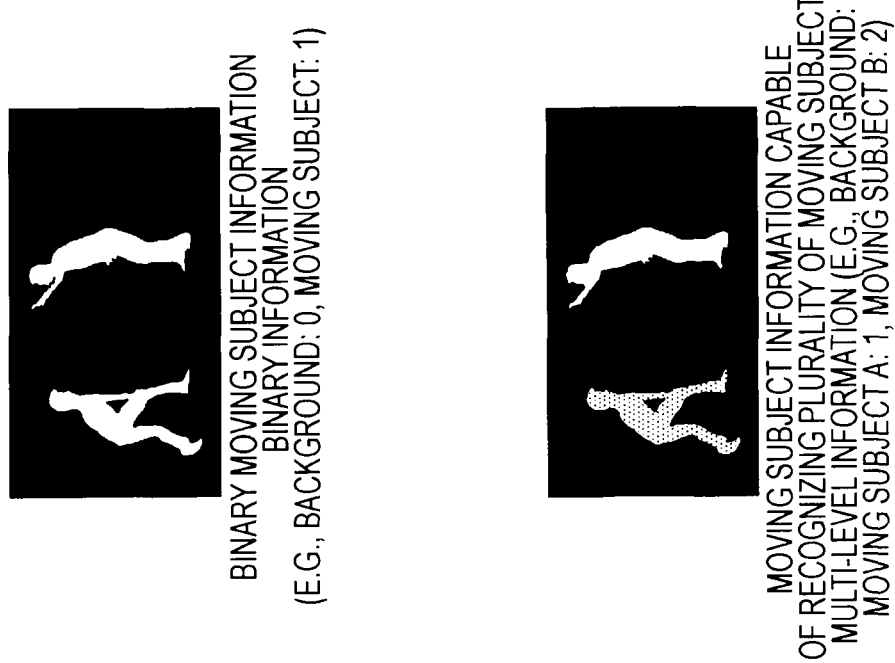
FIGS. 28A and 28B illustrate moving subject information represented using a binary value and moving subject information represented using a multi-level value.
Figure 28B:
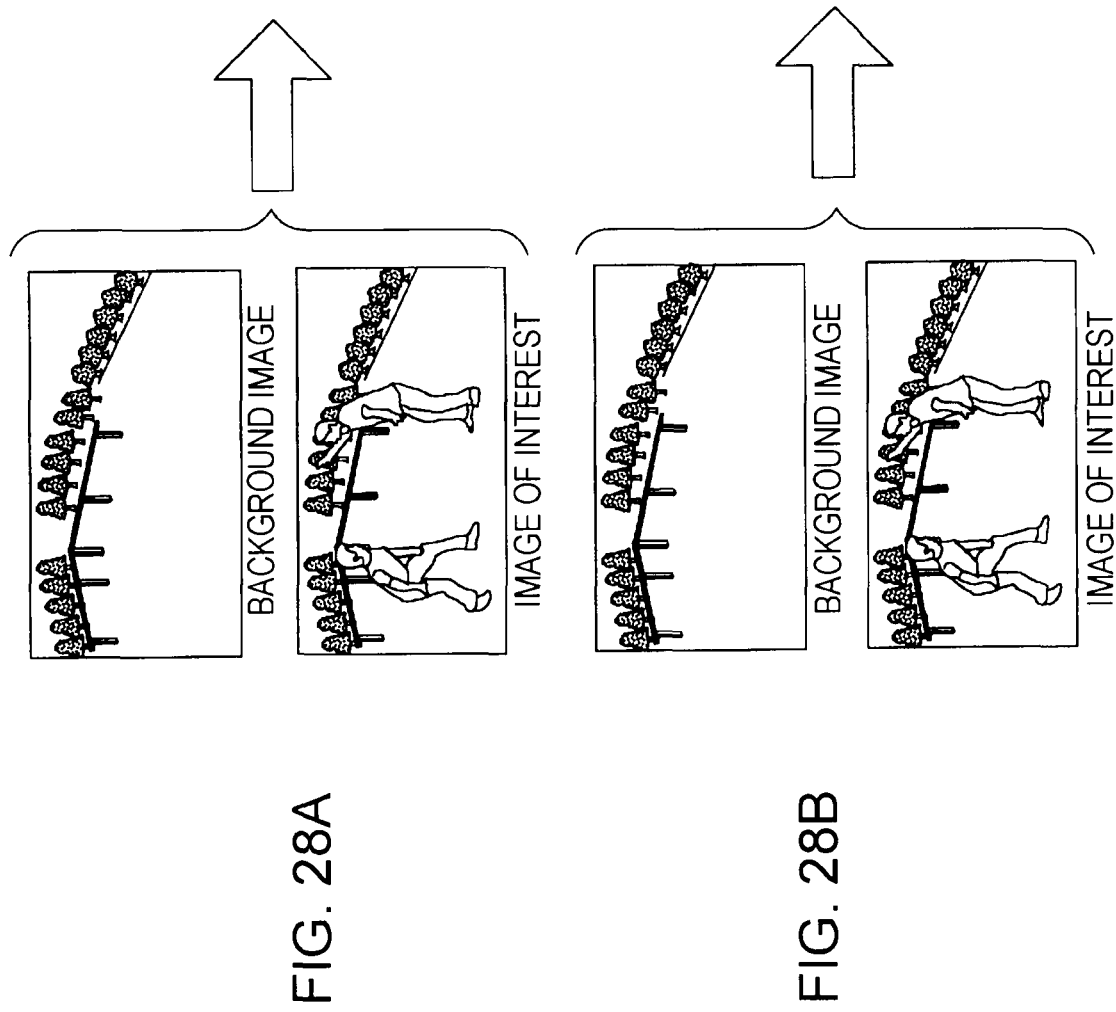

For example, FIGS. 28A and 28B illustrate the cases in which two human images (two moving subject images) are present in frame image data.

In FIG. 28A, the moving subject information is represented using a binary value. In FIG. 28B, the moving subject information is represented using a multi-level value (e.g., a three-level value).

In FIG. 28A, a background is represented by "0", and a moving subject is represented by "1". In this case, each of the two subjects is represented by "1".

In contrast, when a multi-level value is used as shown in FIG. 28B, a background can be represented by "0", one of two moving subjects can be represented by "1", and the other moving subject can be represented by "21".

FIGS. 29A and 29B illustrate the case in which two moving subjects overlap in a screen in a foreground/background relationship.

As shown in FIG. 29A, when a binary is used for the moving object information, it is difficult to differentiate the depths of the two moving subjects.

However, as shown in FIG. 29B, when a multi-level value is used for the moving object information, the foreground/background relationship of a plurality of moving subjects can be differentiated.

As described above, if a multi-level value is used for the moving object information, layer separation can be performed for each of the plurality of moving subject images. Accordingly, for example, different priorities can be given to one of the moving subjects and the other moving subject, and the images can be combined. In addition, the image of only one of the moving subjects can be extracted, and the motion sequence image can be generated.

5. Application of First Example of Processing to Moving Image

As mentioned earlier, a motion sequence moving image as shown in FIGS. 11 to 20 can be generated using even the first example of generation processing.

FIG. 30 illustrates an example of processing performed when a motion sequence moving image is generated and output through the first example of generation processing shown in FIG. 9.

Note that the same numbering will be used in describing processes in FIG. 30 as was utilized above in describing FIG. 9, and the descriptions thereof are not repeated. In FIG. 30, processes in steps identified by reference numerals bearing the suffix "A" (i.e., steps F103A, F109A, F110A, F111A, and F112A) are different from the processes illustrated in FIG. 9.

The points different from the processes illustrated in FIG. 9 are described below.

In step F103 of the processing shown in FIG. 9, the input image selection unit 2 selects only key frames and uses the selected key frames for the image combining process. However, as described above in the second example of generation processing, in order to generate a motion sequence moving image, the input image selection unit 2 uses a key frame and a non-key frame for the image combining process. Accordingly, in step F103A, it is determined whether input frame image data serves as a key frame or a non-key frame (i.e., processing similar to that performed in step F303 shown in FIG. 21 is performed).

In steps F109A to F108 shown in FIG. 30, the input frame image data is subjected to the combining process. In step F109A, the image output unit 4 outputs, to the output device 40, the generated combined image data item in the form of one-frame data that forms the motion sequence moving image (i.e., processing similar to that performed in step F311 shown in FIG. 21 is performed).

In addition, in steps F112A and F110A, the previous combined image data item is updated. That is, this processing is similar to the processing performed in steps F312 and F313 shown in FIG. 21. If the currently input frame image data serves as a key frame, the previous combined image data item stored in the combined image update preserving unit 5 is updated.

In this way, the processing in steps F301 to F110 is performed each time a frame image data item is input. During the processing, a combined image data item is output in the form of a frame that forms a moving image in step F109A each time the image combining process is performed. In this way, for example, the motion sequence moving image as shown in FIGS. 11 to 20 is output to the output device 40.

For example, if the output device 40 serves as a monitor display unit, the motion sequence moving image is displayed. Alternatively, if the output device 40 serves as an image recording unit, each of the frames that form the motion sequence moving image is continuously recorded as moving image data.

If, in step F101, it is determined that input of all of the frames is completed, the processing proceeds to step F111A, where the combining process is completed. In addition, the image output unit 4 stops outputting the combined image data item. Alternatively, when the output device 40 serves as a monitor display unit, the output device 40 continuously outputs the combined image data item of the final frame (e.g., that shown in FIG. 20).

According to the above-described processing illustrated in FIG. 30, a motion sequence moving image is generated using the first example of generation processing and is output.

6. Application of Second Example of Processing to Moving Image

A motion sequence still image can be generated using the second example of generation processing and can be output.

FIG. 31 illustrates an example of processing for generating a motion sequence still image using the second example of generation processing illustrated in FIG. 21.

Note that the same numbering will be used in describing processes in FIG. 31 as was utilized above in describing FIG. 21, and the descriptions thereof are not repeated. In FIG. 31, processes in steps identified by reference numerals bearing the suffix "A" (i.e., steps F303A, F311A, F313A, and F314A) are different from the processes illustrated in FIG. 21.

The points different from the processes illustrated in FIG. 21 are described below.

When, as illustrated in FIG. 21, the motion sequence moving image is generated, a key frame and a non-key frame are used for the combining process, as described above. However, as described above in the first example of generation processing, in order to generate a motion sequence still image, the input image selection unit 2 uses only a key frame for the image combining process.

Accordingly, in step F303A of FIG. 31, the input image selection unit 2 selects only a key frame and supplies the selected key frame to the layer processing unit 3 (i.e., processing similar to that performed in step F103 shown in FIG. 9 is performed).

Subsequently, in steps F304 to F310, the combining process illustrated in FIG. 21 is performed.

In step F311A, the image output unit 4 preserves the generated combined image data item (i.e., processing similar to that performed in step F109 shown in FIG. 9 is performed).

Subsequently, in step F313A, the image output unit 4 supplies the combined image data item to the combined image update preserving unit 5, and the combined image update preserving unit 5 updates the previous combined image data item and the combined image data item preceding the previous combined image data item (i.e., processing similar to that performed in step F110 illustrated in FIG. 9 is performed).

In this way, the processing in steps F301 to F313A is performed each time a key frame is input. Finally, the combined image data item as shown in FIG. 2 can be obtained.

At that time, the processing proceeds to step F301 to F314A, where the image output unit 4 outputs the currently preserved combined image data item (i.e., the combined image data item as shown in FIG. 2) to the output device 40 as motion sequence still image data.

Through such processing illustrated in FIG. 31, one motion sequence still image data item is generated and output.

7. Program

The foregoing embodiment has been described with reference to the image processing apparatus 1. In addition to serving as a dedicated apparatus for generating a motion sequence image, the image processing apparatus 1 of the present embodiment can be applied to a variety of apparatuses that perform image processing. For example, the image processing apparatus 1 can be applied to an image reproducing apparatus, an image pickup apparatus, a communication apparatus, an image recording apparatus, a game console, and a video editing apparatus.

In addition, the image processing apparatus 1 may be realized using a general-purpose personal computer or an information processing apparatus different from a personal computer.

For example, by providing a program that causes an arithmetic processing unit to perform the operations of the processing blocks (steps in FIGS. 9, 10, 21, 22, 30, and 31) in the form of an image processing application software, an appropriate image processing can be performed in, for example, a personal computer.

That is, a program that realizes the image processing performed by the image processing apparatus 1 is a program that causes the arithmetic processing unit to perform the following layer separation step and combining processing step.

In the layer separation step, when frame image data is input, an image combining process including a layer image combining process is performed for a partial area of the existing combined image data item. In the layer image combining process, top priority is given to a moving subject layer of the latest input frame image data item, a second priority is given to a moving subject layer of the frame image data item associated with the previously performed combining processes.

By using such a program, the image processing according to the present embodiment can be performed in personal computers, cell phones, personal digital assistants (PDAs), and other various image processing apparatuses using image data.

Note that the program can be prerecorded in, for example, a hard disk drive (HDD) serving as a recording medium incorporated in an apparatus, such as a personal computer, a read only memory (ROM) in a microcomputer including a central processing unit (CPU), or a flash memory.

Alternatively, the program can be temporarily or permanently stored (recorded) in a removable medium, such as a flexible disk, a compact disk read only memory (CD-ROM), a magneto-optical (MO) disk, a digital versatile disc (DVD), a Blu-ray disc, a magnetic disc, a semiconductor memory, or a memory card. Such a removable recording medium can be supplied in the form of so-called packaged software.

Furthermore, the program can be installed in, for example, a personal computer from the removable recording medium. Still furthermore, the program can be downloaded from a download site via a network, such as a local area network (LAN) or the Internet.

The present application contains subject matter related to that disclosed in Japanese Priority Patent Application JP 2008-209931 filed in the Japan Patent Office on Aug. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a hardware processor configured to:
separate an input frame image data item into a moving subject layer and a background layer; and
generate a combined image data item by performing an image combining process using the input frame image data item, wherein:
in the image combining process, in a predetermined area in which the input frame image data item overlaps with a frame image data item of a previously performed combining process on a different portion of the combined image data item, a layer-image combining process is performed in which a top priority is given to the moving subject layer of the input frame image data item, a second priority is given to a moving subject layer of the frame image data item associated with the previously performed combining process, a third priority is given to the background layer of the input frame image data item, and a fourth priority is given to a background layer of the frame image data item associated with the previously performed combining process;
the predetermined area has an area that is smaller than an area of any of the background layers; and
a portion in the background layer of the input frame image data item is shifted with respect to a corresponding portion in the background layer of the frame image data item associated with the previously performed combining process, in the combined image data item.

2. The image processing apparatus according to claim 1, wherein the hardware processor is configured to:
output, in a form of a motion sequence still image data item, the combined image data item obtained through the image combining process performed for a predetermined number of frame image data items.

3. The image processing apparatus according to claim 2, wherein the hardware processor is configured to:
select a key frame used for generating the combined image data item from among the input frame image data items, and
perform the image combining process according to the frame image data item selected as a key frame to generate the motion sequence still image data item.

4. The image processing apparatus according to claim 3, wherein the hardware processor is configured to:
preserve the combined image data item as an existing combined image data item used for the next image combining process.

5. The image processing apparatus according to claim 1, wherein the hardware processor is configured to:
continuously output, in a form of a motion sequence moving image data item, the combined image data item each time a combined image data item is generated.

6. The image processing apparatus according to claim 5, wherein the hardware processor is configured to:
select a key frame used for generating a combined image from among the input frame image data items; and
preserve, as an existing combined image data item used for the next image combining process, the combined image data item generated through the combining process performed according to the key frame.

7. The image processing apparatus according to claim 6, wherein the hardware processor is configured to generate the motion sequence moving image data item by generating the combined image data item through an image combining process performed according to each of the input frame image data items regardless of whether the input frame image data item is selected as a key frame.

8. The image processing apparatus according to claim 1, wherein, upon performing the image combining process in which the input frame image data item is combined with the predetermined area of an existing combined image data item, the hardware processor is configured to selectively perform, in accordance with a position of a pixel to be processed, one of a process in which a pixel extracted from the input frame image data item is applied to the predetermined area, a process in which a pixel extracted from the moving subject layer of the input frame image data item is applied to the predetermined area, a process in which a pixel extracted from one of the previously generated combined image data items is applied to the predetermined area, and a layer image combining process using a latest input frame image data item and one of the previously generated combined image data items.

9. The image processing apparatus according to claim 8, wherein, in the layer image combining process, a top priority is given to a pixel of the moving subject layer of the input frame image data item, a second priority is given to a pixel of the moving subject layer of a frame image data item associated with the previously performed combining process, and a third priority is given to a pixel of the background layer of the input frame image data item.

10. The image processing apparatus according to claim 8, wherein the layer image combining process is performed by giving a top priority to a pixel of the moving subject layer of the input frame image data item, second to n-th priorities to pixels of frame image data items associated with a one-process preceding combined image data item, and a (n+1)th priority to a pixel of the background layer of the latest input frame image data item.

11. The image processing apparatus according to claim 1, wherein the subject in the background layer of the input frame image data item and the subject in the background layer of the frame image data item associated with the previously performed combining process are at a substantially same position with respect to the combined image data item.

12. The image processing apparatus according to claim 1, wherein an aspect ratio of the combined image data item is changed from the frame image data item.

13. The image processing apparatus according to claim 1, wherein an area of the combined image data item is extended from the frame image data item.

14. An image processing apparatus comprising:
a hardware processor configured to:
separate an input frame image data item into a moving subject layer and a background layer; and generate a combined image data item by performing an image combining process using the input frame image data item, wherein:

in the image combining process, in a predetermined area in which the input frame image data item overlaps with a frame image data item of a previously performed combining process on a different portion of the combined image data item, a layer-image combining process is performed in which a top priority is given to the moving subject layer of the input frame image data item, a second priority is given to a moving subject layer of the frame image data item associated with the previously performed combining process, a third priority is given to the background layer of the input frame image data item, and a fourth priority is given to a background layer of the frame image data item associated with the previously performed combining process, and the layers are displayed;

the predetermined area has an area that is smaller than an area of any of the background layers; and a portion in the background layer of the input frame image data item is shifted with respect to a corresponding portion in the background layer of the frame image data item associated with the previously performed combining process, in the combined image data item.

15. A method for processing an image, comprising:

separating, by a hardware processor, an input frame image data item into a moving subject layer and a background layer; and performing, by the hardware processor to generate a combined image data item, an image combining process including a layer-image combining process using the input frame image data item, wherein:

the layer-image combining process is performed for a predetermined area in which the input frame image data item overlaps with a frame image data item of a previously performed combining process on a different portion of the combined image data item by giving a top priority to the moving subject layer of the input frame image data item, giving a second priority to a moving subject layer of a frame image data item associated with the previously performed combining process, giving a third priority to the background layer of the input frame image data item, and giving a fourth priority to a background layer of the frame image data item associated with the previously performed combining process;

the predetermined area has an area that is smaller than an area of any of the background layers; and a portion in the background layer of the input frame image data item is shifted with respect to a corresponding portion in the background layer of the frame image data item associated with the previously performed combining process, in the combined image data item.

16. A method for processing an image, comprising:

separating, by a hardware processor, an input frame image data item into a moving subject layer and a background layer; and performing, by the hardware processor to generate a combined image data item, an image combining process including a layer-image combining process using the input frame image data item, wherein:

the layer-image combining process is performed for a predetermined area in which the input frame image data item overlaps with a frame image data item of a previously performed combining process on a different portion of the combined image data item by giving a top priority to the moving subject layer of the input frame image data item, giving a second priority to a moving subject layer of a frame image data item associated with the previously performed combining process, giving a third priority to the background layer of the input frame image data item, and giving a fourth priority to a background layer of the frame image data item associated with the previously performed combining process, and the layers are displayed;

the predetermined area has an area that is smaller than an area of any of the background layers; and a portion in the background layer of the input frame image data item is shifted with respect to a corresponding portion in the background layer of the frame image data item associated with the previously performed combining process, in the combined image data item.

17. A non-transitory computer readable storage medium having instructions stored therein, which when executed by a hardware processor, cause the hardware processor to:

separate an input frame image data item into a moving subject layer and a background layer; and generate a combined image data item by performing an image combining process including a layer-image combining process using the input frame image data item, wherein:

the layer-image combining process is performed for a predetermined area in which the input frame image data item overlaps with a frame image data item of a previously performed combining process on a different portion of the combined image data item by giving a top priority to the moving subject layer of the input frame image data item, giving a second priority to a moving subject layer of a frame image data item associated with the previously performed combining process, giving a third priority to the background layer of the input frame image data item, and giving a fourth priority to a background layer of the frame image data item associated with the previously performed combining process, and the layers are displayed;

the predetermined area has an area that is smaller than an area of any of the background layers; and a portion in the background layer of the input frame image data item is shifted with respect to a corresponding portion in the background layer of the frame image data item associated with the previously performed combining process, in the combined image data item.

18. A non-transitory computer readable storage medium having instructions stored therein, which when executed by a hardware processor, cause the hardware processor to:

separate an input frame image data item into a moving subject layer and a background layer; and generate a combined image data item by performing an image combining process including a layer-image combining process using the input frame image data item, wherein:

the layer-image combining process is performed for a predetermined area in which the input frame image data item overlaps with a frame image data item of a previously performed combining process on a different portion of the combined image data item by giving a top priority to the moving subject layer of the input frame image data item, giving a second priority to a moving subject layer of a frame image data item associated with the previously performed combining process, giving a third priority to the background layer of the input frame image data item, and giving a fourth priority to a background layer of the frame image data item associated with the previously performed combining process;
the predetermined area has an area that is smaller than an area of any of the background layers; and
a portion in the background layer of the input frame image data item is shifted with respect to a corresponding portion in the background layer of the frame image data item associated with the previously performed combining process, in the combined image data item.

* * * * *